United States Patent

Yuan et al.

[11] Patent Number: 5,966,444
[45] Date of Patent: Oct. 12, 1999

[54] METHOD AND SYSTEM FOR ESTABLISHING A CRYPTOGRAPHIC KEY AGREEMENT USING LINEAR PROTOCOLS

[76] Inventors: Chuan K. Yuan; Feng Q. Hao, both of 993 Jungfrau Ct., Milpitas, Calif. 95035

[21] Appl. No.: 08/761,455

[22] Filed: Dec. 6, 1996

[51] Int. Cl.$^6$ ........................................................ H04K 1/00
[52] U.S. Cl. ................................. 380/21; 380/44; 380/28
[58] Field of Search .................................. 380/21, 28, 49, 380/44

[56] References Cited

U.S. PATENT DOCUMENTS

| | | | |
|---|---|---|---|
| 3,798,359 | 3/1974 | Feistel | 173/22 |
| 3,798,360 | 3/1974 | Feistel | 178/22 |
| 3,798,605 | 3/1974 | Feistel | 340/172.5 |
| 4,200,770 | 4/1980 | Hellman et al. | 178/22 |
| 4,218,582 | 8/1980 | Hellman et al. | 178/22 |
| 4,405,829 | 9/1983 | Rivest et al. | 178/22.1 |
| 4,625,076 | 11/1986 | Okamoto et al. | 178/22.11 |
| 4,748,668 | 5/1988 | Shamir et al. | 380/30 |
| 4,850,019 | 7/1989 | Shimizu et al. | 380/29 |
| 4,995,082 | 2/1991 | Schnorr | 380/23 |
| 5,003,596 | 3/1991 | Wood | 380/28 |
| 5,541,994 | 7/1996 | Tomko et al. | 380/21 |
| 5,625,692 | 4/1997 | Herzberg et al. | 380/21 |
| 5,734,720 | 3/1998 | Salganicoff | 380/21 |
| 5,758,257 | 5/1998 | Herz et al. | 380/21 |

OTHER PUBLICATIONS

"New Directions in Cryptography", Whitfield Diffie, etc., IEEE Transactions on Information Theory, vol. IT–22, No. 6, Nov., 1976, pp. 644–654.

*Primary Examiner*—David Cain
*Attorney, Agent, or Firm*—Skjerven, Morrill, MacPherson, Franklin & Friel; Edward C. Kwok

[57] ABSTRACT

A method for establishing key agreement between two communicating parties using a general linear protocol in finite and infinite dimensional spaces. Two topological linear spaces, in particular Euclidean spaces, and a non-trivial degenerate linear operator are selected. Each party respectively selects a secret element, and exchanges with the other party an image under the transformation of a matrix. Key agreement is therefore mutually established between the two communicating parties having the same cryptographic key. Various illustrative embodiments of the general linear operator are disclosed, including a rectangular matrix, a square matrix, a symmetric matrix, a skew symmetric matrix, an upper triangular square matrix, a lower triangular square matrix, a special type of skew symmetric matrix to generate a modified cross product protocol, a series of matrices to generate a sequential key protocol, and a combination of circulant matrices.

20 Claims, 12 Drawing Sheets

METHOD AND SYSTEM FOR ESTABLISHING A CRYPTOGRAPHIC KEY AGREEMENT USING LINEAR PROTOCOLS

BACKGROUND OF THE INVENTION

1. Field of the Invention

This invention relates generally to cryptography, and more particularly, to a method for achieving the establishing of key agreement between two communicating parties.

2. Description of the Related Art

Cryptographic systems ensure the privacy of a message transmitted over an untrusted communication channel, such as intranets, the Internet, the World Wide Web, cellular phones, and cordless phones. A principal purpose for a cryptographic system is to maintain the secrecy of a transmitted message from unauthorized parties, and therefore assuring the sender that the message is only being read by the intended recipient. To preserve such secrecy, a message can be encrypted to a ciphertext by an encryption method, such as private-key encryption, also referred to as symmetric encryption, secret-key encryption, or single-key encryption.

Private key encryption requires both an encryption algorithm and a cryptographic key. The encryption algorithm provides security for a message by making it impractical for an eavesdropper to decrypt the ciphertext back into the plaintext message on the basis of the ciphertext alone. Suitable encryption algorithms for a private key encryption include DES, IDEA, and RC5. The cryptographic key is a selected value which is independent of the plaintext, and controls the encryption algorithm. The encryption algorithm generates an output ciphertext that depends on the specific cryptographic key used at the time, so that a change in the cryptographic key causes the encryption algorithm to generate a different output ciphertext. After a sender has encrypted a plaintext into a ciphertext, the sender transmits the ciphertext to its intended recipient. The recipient then converts the ciphertext back to the plaintext using a decryption algorithm.

The security of a message depends on the secrecy of the cryptographic key used to encrypt the message. Two mechanisms are typically used to allow communicating parties to establish the cryptographic key: (1) key distribution, and (2) key agreement. Key distribution is a mechanism by which one party transfers the actual cryptographic key to another party. Key agreement denotes a protocol whereby two or more parties jointly establish a cryptographic key across an untrusted communication channel without the physical transfer of the cryptographic key. A well-known example of establishing a cryptographic key by establishing a key agreement between multiple parties is the Diffie-Hellman method.

The Diffie-Hellman method is based on the apparent difficulty in computing logarithms over a finite field GF(q) with a prime number q of elements. For two communicating parties 1 and 2, the Diffie-Hellman method uses a key $K=a^{X1X2}$ mod q, where "mod" denotes a modulo operation. Modulo is an operation this is similar to the operation of obtaining a remainder in an arithmetic division. In the Diffie-Hellman method, a party i publishes in a public system the value $Y_i = a^{Xi}$ mod q, where Xi is a private undisclosed value in GF(q). To communicate with a party j, party i obtains a key $K_{ij}$ by computing $K_{ij}=(Y_j)^{Xi}$ mod q. Similarly, party j obtains the key $K_{ij}$ by computing $K_{ij}=(Y_i)^{Xj}$ mod q. The Diffie-Hellman method is disclosed in U.S. Pat. No. 4,200,770, entitled "Cryptographic Apparatus and Method," issued on Apr. 29, 1980, to Hellman et al.

The drawback of the Diffie-Hellman method is that the computation of the cryptographic key is slow due to the intensive computation of modulo (i.e. mod q) and exponentiation over a finite field GF(q). The combination of the modulo operation and the calculation of the exponential $a^{X1X2}$ result in slow performance.

Hence, it is desirable to have a faster protocol for establishing key agreement between multiple communication devices across an untrusted communication channel.

SUMMARY OF THE INVENTION

In accordance with the principles of the present invention, a method is provided for establishing key agreement between multiple communication devices using a general linear protocol. This method includes the steps of (a) selecting a topological linear space V, and a topological linear space $V_2$, linear space $V_1$ having a dual space $V_1^*$ and linear space $V_2$ having a dual space $V_2^*$; (b) selecting a singular linear operator T, mapping linear space $V_1$ to linear space $V_2$, and a conjugate operator T*, mapping dual space $V_2^*$ into dual space $V_1^*$; (c) selecting in the first device, a secret element x in the topological linear space $V_1$; (d) selecting in the second device, a secret element y in the dual space V2*; (e) sending from the first device to the second device the value T(x); (f) sending from the second device the value T*(y); (g) computing in the first device the functional value (x, T*(y)); (h) computing in the second device the functional value (T(x), y); (i) using the value (x, T*(y)) as the encryption key when sending a message from the first device to the second device or as the decryption key for the first device when receiving a ciphertext from the second device; and (j) using as an encryption key (T(x), y) when sending a message from the second device to the first device or as the decryption key for the second device when receiving a ciphertext from the first device.

One advantage of the general protocol of the present invention is achieved because linear operators such as arithmetic operations of multiplication and addition can be used. Hence, the present invention need not involve computationally intensive operations such as exponentiation, modulo arithmetic, and prime numbers. The linear operations are simple arithmetic operations which can lie efficintly processed by computers.

In one embodiment, the general linear protocol uses a rectangular matrix. Other embodiments of the general linear protocol use other types of matrices, such as symmetric matrices, skews symmetrices, upper triangular square matrices, and lower triangular square matrices for variety of purposes of applications. Other variations of the present invention include selecting a particular type of skew symmetric matrix to develop a modified cross product protocol using a series of matrices to generate a sequential key protocol, and selecting a combination of circulant matrices to form a linear operator.

The present invention allows a cryptographic key to be quickly and efficiently established between communicating parties while maintaining a high level of security on messages communicated.

The present invention is better understood upon consideration of the detailed description below and the accompanying drawings.

DETAILED DESCRIPTION OF THE PREFERRED EMBODIMENT

Figure 1:
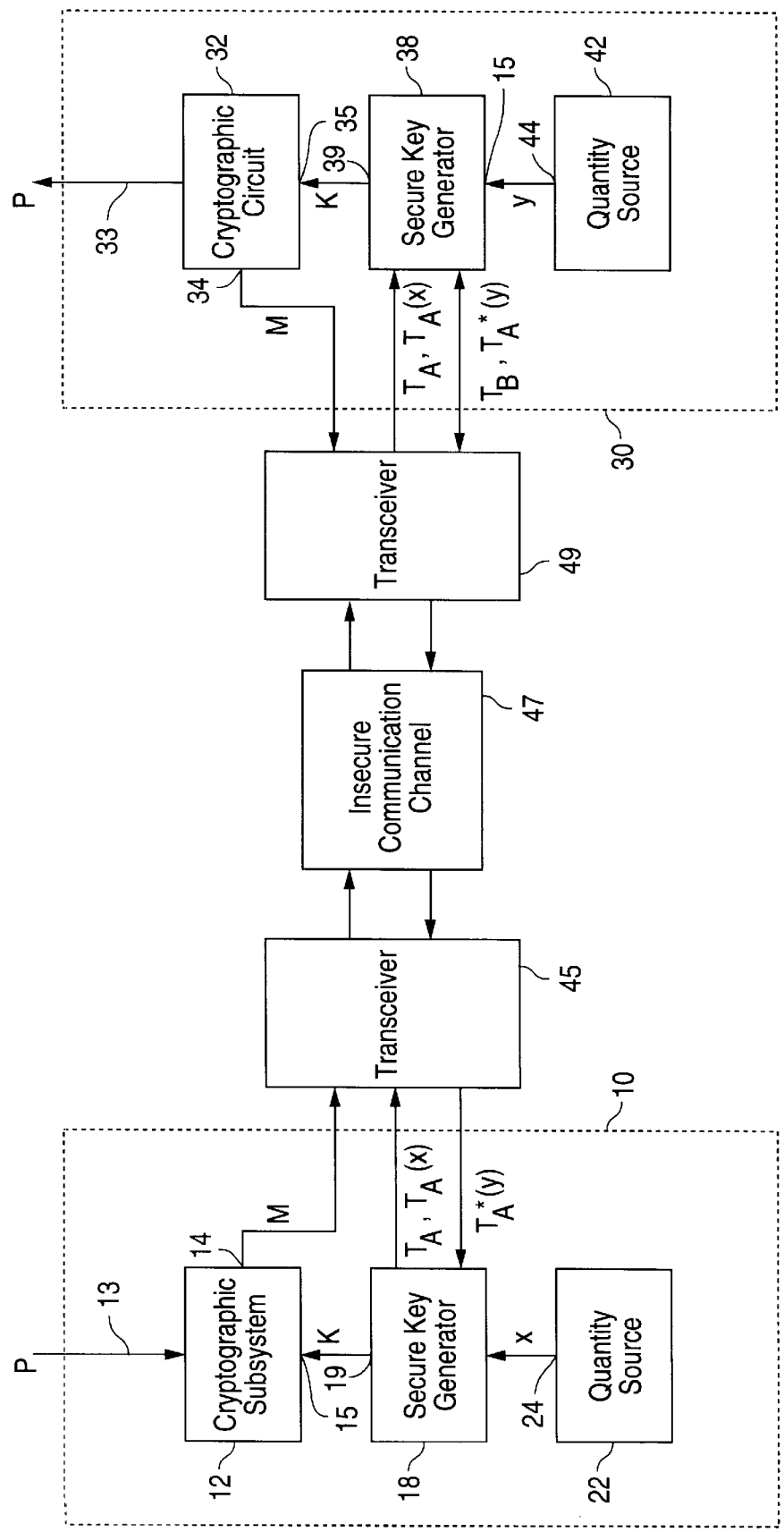
FIG. 1 is a block diagram of a cryptographic system for establishing key agreement through an insecure communication channel.
Figure 2:
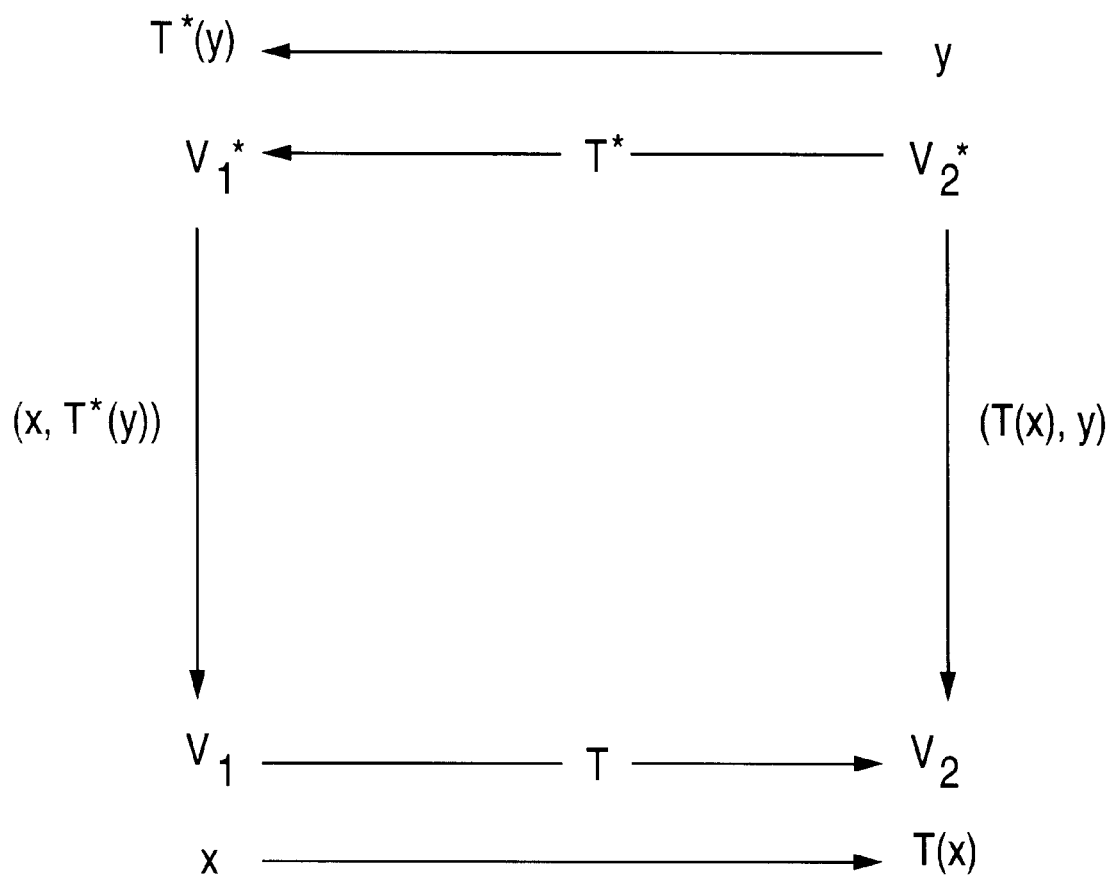
FIG. 2 is a spatial diagram showing the duality of the conjugate linear operators in topological linear spaces.

As shown in FIG. 1, communication devices 10 and 30, having transceivers 45 and 49, establish key agreement over a communication channel 47. Communication device 10 includes a cryptographic subsystem 12, a secure key generator 18, and a source of a numerical quantity 22 ("quantity source"). Similarly, communication device 30 includes a cryptographic subsystem 32, a secure key generator 38, and a source of a numerical quantity 42. Cryptographic subsystems 12 and 32 receive plaintext at plaintext ports 13 and 33 and provides output ciphertext at ciphertext ports 14 and 34 using the keys generated by secure key generators 18 and 38. Quantity sources 22 and 42 can each be implemented by, for example, a random number generator.

Upon establishing the key used in communication, i.e. achieving key agreement, ciphertext messages from cryptographic subsystem 12, represented by the character "M", are provided through a ciphertext port 14 to transceiver 45 to be transmitted to communication device 30 over a communication channel 47. Such a communication channel can be a telephone link, a radio link, a microwave link, a coaxial cable link, a fiber optic link, or any other suitable communication medium. At communication device 30, transceiver 49 receives the ciphertext and provides the ciphertext over ciphertext port 34 to cryptographic subsystem 32. Cryptographic subsystem 32 decrypts the ciphertext by converting the ciphertext M back to a plaintext message P.

The key agreement protocol in accordance with this invention is achieved based on the property of linear spaces, linear operators, and linear functionals.

A linear space, either of finite dimensions or of infinite dimensions, is defined over the set of all real numbers "R", or over the set of all complex numbers "C". A linear space V is closed under "addition" and closed under "scalar multiplication", and has the following properties for all elements x, y, z in V, and scalars $\alpha$ and $\beta$ in R (or C):

(1) Addition is commutative, i.e. x+y=y+x
(2) Addition is associative, i.e. (x+y)+z=x+(y+z).
(3) V includes an addition identity which is typically denoted by 0.
(4) Each x in V has an additive inverse in V which is denoted by $-x$.
(5) Scalar Multiplication in V is associative, i.e., $\alpha$ ($\beta$ x)=($\alpha$ $\beta$) x
(6) Scalar Multiplication is distributive over numbers from R(or C), ($\alpha+\beta$) x=$\alpha$x+$\beta$x
(7) Scalar Multiplication is distributive over elements from V, $\alpha$ (x+y)=$\alpha$x+60 1y.
(8) There is a multiplication identity in R (or C), typically denoted by 1.

A linear operator, or a linear transformation, typically denoted "T", is a mapping from a linear space "V" into a linear space "W", which satisfies the relation:

$$T(ax+by)=aT(x)+bT(y),$$

where x, y are elements in V for any a, b, in R(or C). A linear operator T is singular or not invertable, if there exists no inverse operator $T^{-1}$, such that $T^{-1}T(x)=TT^{-1}(x)=x$ for all x in V.

A linear functional on a linear space V, typically denoted by "f", is a linear operator mapping space V into R. The concept of functional is a generalization of the concept of real or complex value function which is a mapping from a set of real or complex numbers into a set of real or complex numbers. People usually denote the value of a functional f at any element x in V by either f(x) or (x, f).

When a metric for "distance" or "length" is defined in a linear space, the linear space and the associated metric form a topological linear space. In a topological linear space, references to the continuity of an operator and the continuity of a functional are possible. The notion of continuity of operator or functional is a generalization of the concept of notion of continuity of function in Calculus.

For any topological linear space V, the dual space V* is the set of all continuous linear functionals on V.

Related to the concept of dual space, let T be a linear operator from $V_1$ into $V_2$, the conjugate operator T* of T is defined to be a linear operator from $V_2^*$ into $V_1^*$, such that $$(T(x),f)=(x,T^*(f))$$

for all x in $V_1$ and all f in $V_2^*$. This definition shows the duality between T and T*.

An example of a topological linear space is the Hilbert space. A Hilbert space can be a complete infinite dimensional linear space with elements as sequencer of real or complex numbers: $x=(x_1, x_2 \ldots, x_n, \ldots)$ The metric in the space, i.e. the length of any element x, is defined to be $$\|x\|=\{x_1^2+x_2^2+ \ldots +x_n^2+ \ldots \}^{1/2}$$

An example of a finite dimensional linear space includes real or complex linear spaces consisting of all the real or complex n-tuples $(x_1, \ldots, x_n)$ for all positive integers n. A typicla real as complex Euclidean space $R^n$ (or $C^n$) with the metric, i.e. the length of any element x, is defined as follows:

$$\|x\| = \{x_1^2 + \ldots + x_n^2\}^{1/2}$$

where $x=(x_1, \ldots, x_n)$. Real or complex Euclidean spaces $R^n$ and $C^n$ are examples of Hilbert spaces for all positive integers n.

Any linear operator T that maps a finite dimensional linear space into another can be represented by a matrix A, and conversely, any matrix A can be used to define a linear transformation mapping a finite dimensional linear space into another. Thus means the image T(x) of any element x can be calculated by matrix multiplication A x=T(x).

Any functional on a Hilbert space V can be represented by an element in the same space V, and functionals on Hilbert Space. For any linear functional f on V, there exists a unique element $Y=(Y_1, \ldots, Y_n, \ldots)$ in V such that the value of f at any element $x=(x_1, \ldots, X_n, \ldots)$ in V can be evaluated by an infinite sum as follows:

$$f(x) = (x, f) = \sum_{i=1}^{\infty} x_i y_i$$

Thus the functional f and the representation of element y can be identified.

In partecular, for any functional f on a Euclidean space $R^n$ (or $C^n$), there exists a unique element $y=(Y_1, \ldots, Y_n)$ in $R^n$ (or $C^n$), such that the value of f at any element $x=(X_1, \ldots, X_n)$ in $R^n$ (or $C^n$) can be evaluated by a finite sum as follows:

$$f(x) = (x, y) = \sum_{i=1}^{n} x_i y_i$$

If the spaces $V_1$ and $V_2$ are finite dimensional with dimensions n and m respectively, then any linear operator T is represented by a rectangular matrix A of m-rows and n-columns, and its conjugate operator T* is represented by the transpose $A^t$.

For a Hilbert space V, the dual space V* is the same as V, that is V*=V. This characterzation of the Hilbert space is sometimes known as reflexive. In a particular case, a Euclidean space $R^n$ is reflexive, that is $(R^n)*=R^n$, such that every element of $R^n$ is considered to be a continuous linear functional on $R^n$. Hence, if $V_1=R^n$ and $V_2=R^m$, and let the matrix A define a linear operator from $R^n$ into $R^m$, then the duality becomes:

(x, $A^t$ y)=(A x, y)

for any x in $R^n$ and any y in $R^m$

The present invention is disclosed in the following using the principles discussed above. Let $V_1$ and $V_2$ denote two topological linear spaces. Let T denote a singular linear operator or a linear transformation from topological linear space $V_1$ into topological linear space $V_2$. Let T* denote a singular conjugate linear operator from the dual space $V_2^*$ of $V_2$ to the dual space $V_1^*$ of $V_1$. T and T* are selected such that, (1) for any element x in topological linear space $V_1$, T(x) is in topological linear space $V_2$, (2) for any element y in the topological linear space $V_2^*$, T*(y) is in the topological linear space $V_1^*$, and (3) the following principle of dual equality holds for the value of functional T*(y) at x and the value of functional y at T(x): i.e.

(x, T*(y))=(T (x), y)

Figure 3:
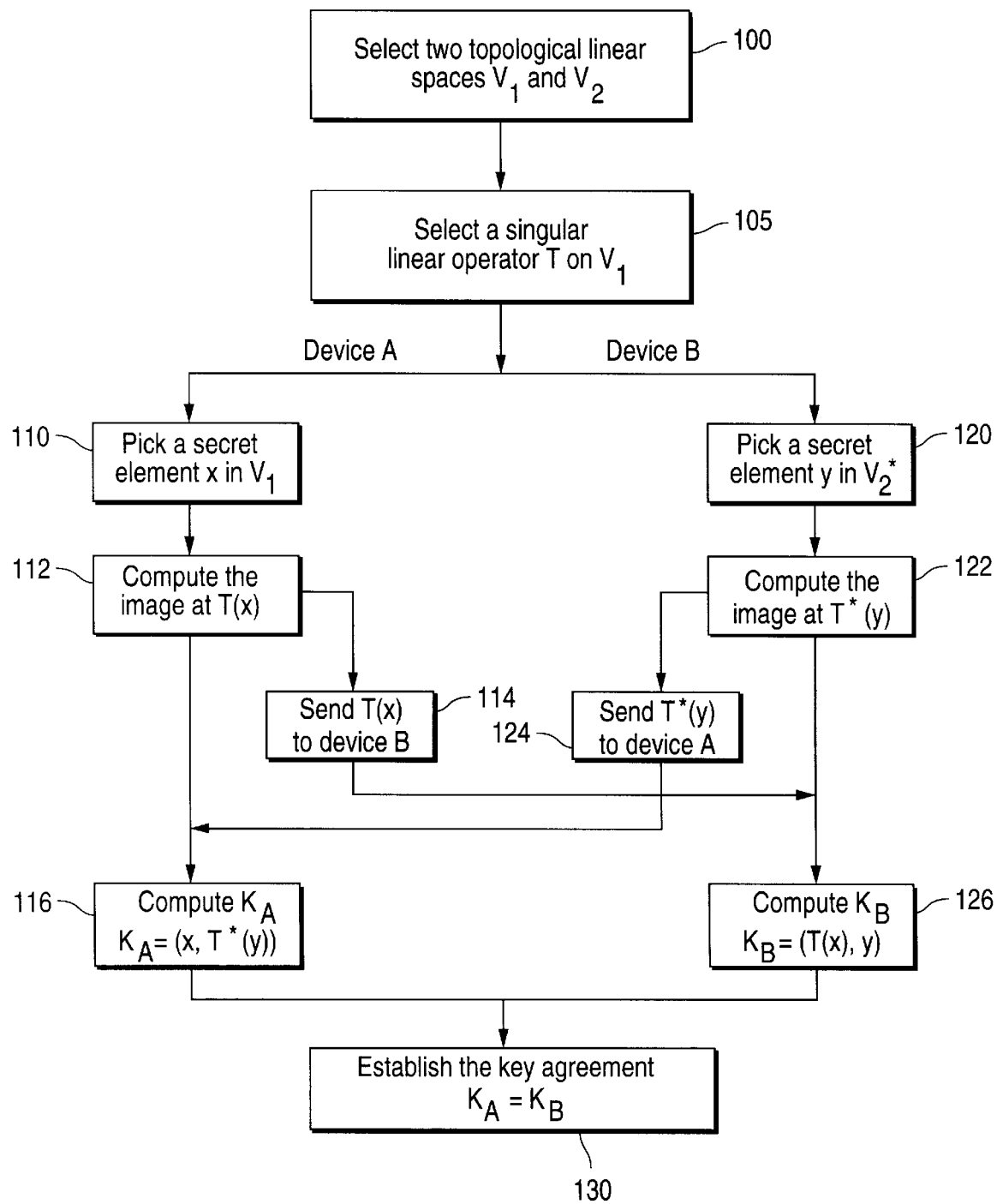
FIG. 3 is a flow diagram of a general linear protocol for establishing key agreement between multiple communication devices.

FIG. 3 is a flow diagram illustrating a method for establishing key agreement between multiple communication devices in the present invention. According to FIG. 3, using the communication system of FIG. 1 as an example, communication devices 10 and 30 respectively select at step 100 topological linear spaces $V_1$ and $V_2$. At step 105, a non-trivial singular linear operator T mapping linear space $V_1$ into linear space $V_2$ is selected. If the non-trivial singular operator T is selected by communication device 10 or 30, then the singular linear operator T is transmitted to the other device 10 or 30.

In communication device 10, quantity source 22 picks at step 110 a non-zero secret element x in topological linear space $V_1$. Then, secure key generator 15 18 computes at step 112 the image T(x) in $V_2$ of the secret element x. At step 114, secure generator 18 of communication device 10 then transmits the image T(x) to secure key generator 38 of communication device 30.

Upon receiving T, at step 120, quantity source 42 picks a non-zero secret element y in topological linear space $V_2$, and determines the conjugate operator T*. At step 122, secure key generator 38 computes T*(y). At step 124, secure generator 38 transmits T*(y) to secure key generator 18. Because linear and conjugate 25 operators T and T* are singular, i.e. no inverse operator exists, any hacker or eavesdropper intercepting T, T(x) and T*, T*(y) will not be able to decipher the secret elements x and y.

At step 116, communication device 10 determines the value of the cryptographic key $K_A$, based on secret element x and T*(y) received from communication device 30. The value of the cryptographic key $K_A$ is equal to the functional value (x, T*(y)). Similarly, at step 126, communication device 30 determines the value of the cryptographic key $K_B$, based on secret element y and T(x) received from communication device 10. The value of the cryptographic key $K_A$ is equal to the functional value (T(x), y).

By the principle of duality designed in selecting T and T*, the cryptographic key $K_A$ is equal to the cryptographic key $K_B$, or in functional terms $K_A=(T(x), y)=(x, T*(y))=K_B$. Thus, key agreement is achieved between communication devices 10 and 30.

Rectangular Matrix Protocol

Figure 4:
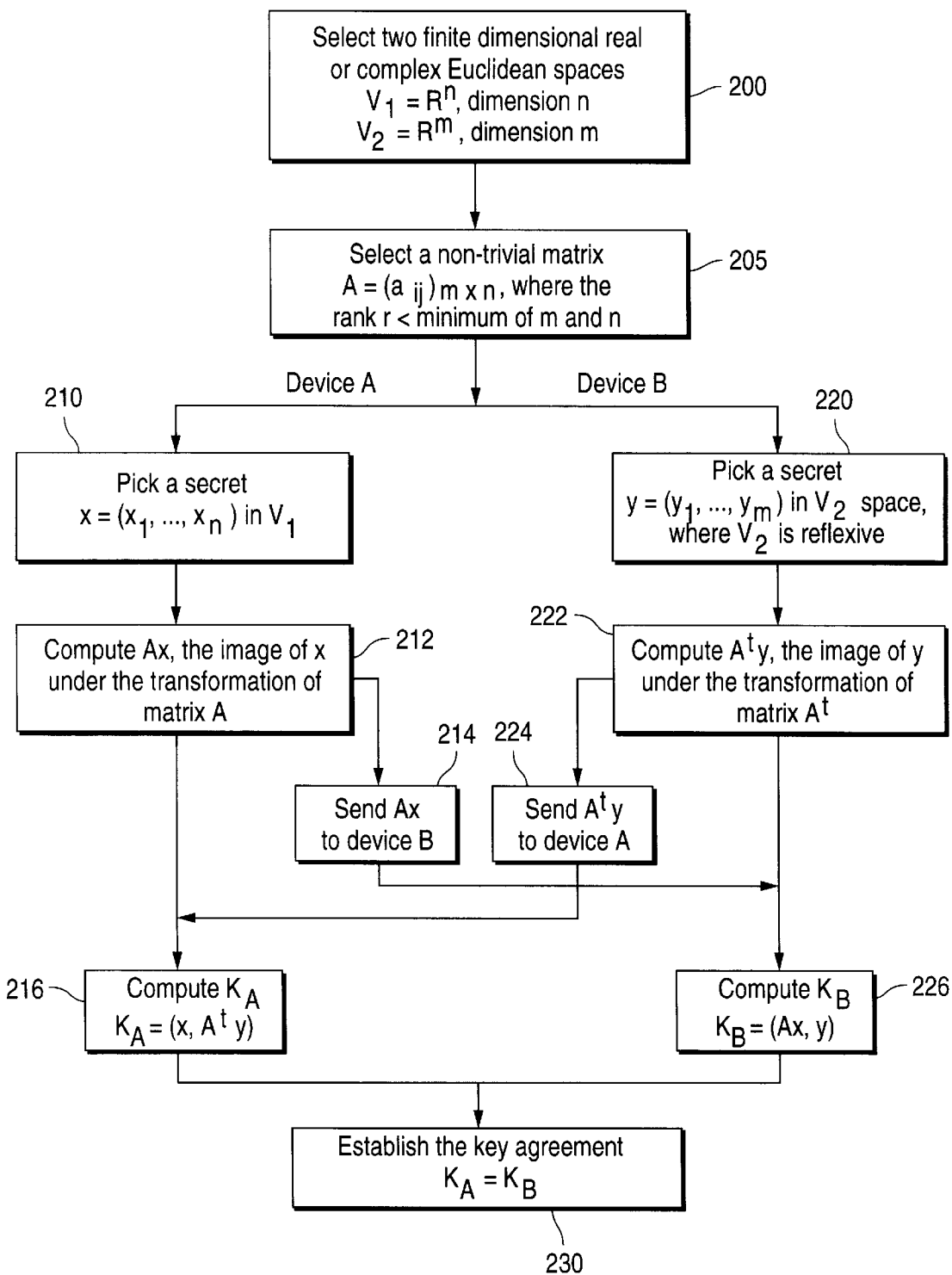
FIG. 4 is a flow diagram of a first embodiment of the general linear protocol implemented with a rectangular matrix in Euclidean spaces.

FIG. 4 is a flow diagram showing a first embodiment of the present invention using a rectangular matrix. In this embodiment, two finite dimensional real or complex Euclidean spaces $V_1$ and $V_2$ are selected, where $V_1=R^n$ with dimension n and $V_2=R^m$ with dimension m. The dual spaces $V_1^*$ and $V_2^*$ of $V_1$ and $V_2$ are $V_1$, $V_2$ themselves. A non-trivial matrix A is selected, where $A=(a_{ij})_{m \times n}$ with its rank r less than the minimum of dimension m and dimension n. The conjugate operator is $A^t$, which is the transpose of A, denoted by $A^t$.

At step 210, communication device 10 picks a secret element $x=(x_1, x_2, \ldots, x_n)$ in space $V_1$. At step 212, communication device 10 computes the image of the element x under the transformation as defined by the matrix A, i.e. the product of matrices A and x, denoted by Ax. At step 214, communication device 10 sends Ax to communication device 30. At step 220, communication device 30 picks a secret element $y=(Y_1, Y_2, \ldots, Y_m)$ in space $V_2$. At step 222, communication device 30 computes the image of the element y under the transformation as defined by the matrix $A^t$, i.e. the product of matrices $A^t$ and y, denoted by $A^t y$. At step 224, communication device 30 sends $A^t y$ to communication device 10.

At step 216, communication device 10 computes the functional value $K_A=(x, A^t y)$ as the value of the cryptographic key. At step 226, communication device 30 computes the functional value $K_B=(Ax, y)$ as the value of the cryptographic key. Because of the duality of A and $A^t$, $K_A$ and $K_B$ are equal. Thus, at step 230, communication devices 10 and 30 established mutually key agreement between them.

The following numerical example illustrates key agreement under the protocol described above. In this example, a 5-dimensional Euclidean space $V_1=R^5$ and a 4-dimensional Euclidean space=$R^4$ are selected. In addition, a matrix A is selected as follows:

$$A = \begin{pmatrix} 1 & 2 & 5 & 0 & 4 \\ 0 & 1 & -1 & 7 & 0 \\ 0 & 0 & 1 & -1 & 2 \\ 0 & 0 & 0 & 0 & 0 \end{pmatrix}$$

The rand of matrix A is 3.

Let the first communication device pick a secret element $x=(1, 2, 3, 4, 5)$ in $R^5$. The first communication device computes Ax:

$$Ax = \begin{pmatrix} 1 & 2 & 5 & 0 & 4 \\ 0 & 1 & -1 & 7 & 0 \\ 0 & 0 & 1 & -1 & 2 \\ 0 & 0 & 0 & 0 & 0 \end{pmatrix} \begin{pmatrix} 1 \\ 2 \\ 3 \\ 4 \\ 5 \end{pmatrix} = \begin{pmatrix} 40 \\ 27 \\ 9 \\ 0 \end{pmatrix}$$

and sends $$\begin{pmatrix} 40 \\ 27 \\ 9 \\ 0 \end{pmatrix}$$

to the second communication device.

The second communication device picks a secret element $y=(3, 7, 5, 1)$ in $R^4$. The second communication device computes $A^t y$:

$$A^t y = \begin{pmatrix} 1 & 0 & 0 & 0 \\ 2 & 1 & 0 & 0 \\ 5 & -1 & 1 & 0 \\ 0 & 7 & -1 & 0 \\ 4 & 0 & 2 & 0 \end{pmatrix} \begin{pmatrix} 3 \\ 7 \\ 5 \\ 1 \end{pmatrix} = \begin{pmatrix} 3 \\ 13 \\ 13 \\ 44 \\ 22 \end{pmatrix}$$

and sends $$\begin{pmatrix} 3 \\ 13 \\ 13 \\ 44 \\ 22 \end{pmatrix}$$

to the first communication device.

The first communication device, upon receiving $A^t y$, computes the value of the cryptographic key $K_A$:

$$K_A = (x, A^t y) = (1 \quad 2 \quad 3 \quad 4 \quad 5) \begin{pmatrix} 3 \\ 13 \\ 13 \\ 44 \\ 22 \end{pmatrix} = 354$$

The second communication device, upon receiving Ax, computes the value of the cryptographic key $K_B$:

$$K_B = (A_x, y) = (40 \quad 27 \quad 9 \quad 0) \begin{pmatrix} 3 \\ 7 \\ 5 \\ 1 \end{pmatrix} = 354$$

Therefore, key agreement between the first and second communication devices have been securely and mutually established. To increase the robustness of the protocol, parties may employ larger numbers as components of the elements, such as 8-digit numbers.

Square Matrix Protocol

Figure 5:
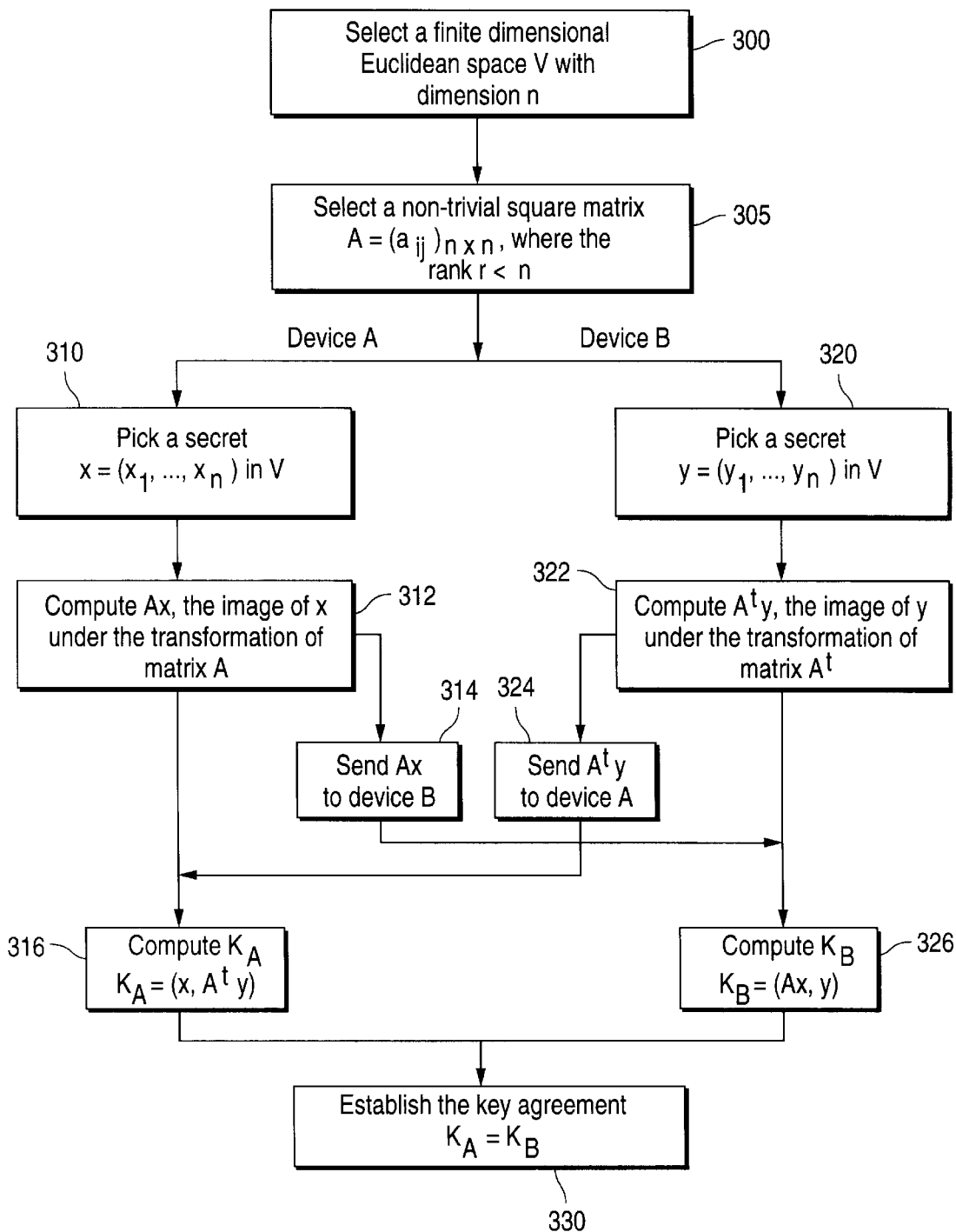
FIG. 5 is a flow diagram of a second embodiment of the general linear protocol implemented with a square matrix in Euclidean spaces.

FIG. 5 is a flow diagram of a second embodiment of the present invention using a square matrix. In this embodiment, a finite dimensional Euclidean space $V=R^n$ with dimension n is selected. A non-trivial square matrix A is selected, where $A=(a_{ij})_{n \times n}$ such that the rank r is less than the dimension n.

At step 310, communication device 10 picks a secret element $x=(x_1, x_2, \ldots, x_n)$ in space V. At step 312, communication device 10 computes the image of the element x under the transformation of the matrix A, i.e. the product of matrices A and x, denoted by Ax. At step 314, communication device sends Ax to communication device 30. The matrix A is singular because the rank of A is less than diminsion n, which prevents others from deciphering the secret element x from its image Ax.

At step 320, communication device 30 picks a secret element $y=(Y_1, Y_2, \ldots, Y_n)$ in space V. At step 322, communication device 30 computes the image of the element y under the transformation as defined by the matrix $A^t$, i.e. the transpose of A, denoted by $A^t y$. At step 324, communication device 30 sends $A^t y$ to communication device 10. The matrix $A^t$ is singular because the rank of $A^t$ is less than dimension n.

At step 316, communication device 10 computes the functional value $K_A=(x, A^t y)$ as the value of the cryptographic key. At step 326, communication device 30 computes the functional value $K_B=(Ax, y)$ as the value of the cryptographic key. Because of the duality of A and $A^t$, $K_A$ and $K_B$ equal. Thus, at step 230, communication devices 10 and 30 established mutually key agreement between them.

The following numerical example illustrates key agreement under the protocol described above. In this example, 6-dimensional spaces $V=R^6$ is selected. In addition, a matrix A is selected as follows:

$$A = \begin{pmatrix} 1 & 9 & -7 & 0 & 0 & 4 \\ 0 & 13 & 11 & 0 & 5 & 0 \\ -8 & 7 & 0 & 2 & 0 & 6 \\ 1 & 22 & 4 & 0 & 5 & 4 \\ 8 & 6 & 11 & -2 & 5 & -6 \\ 1 & 0 & 1 & 0 & 1 & 0 \end{pmatrix}$$

The rand of martix A is 4.

Let the first communication device pick a secret element $x=(11 \ -0 \ 6 \ -2 \ 10)$ in $R^6$. The first communication device computes the value of Ax:

$$Ax = \begin{pmatrix} 1 & 9 & -7 & 0 & 0 & 4 \\ 0 & 13 & 11 & 0 & 5 & 0 \\ -8 & 7 & 0 & 2 & 0 & 6 \\ 1 & 22 & 4 & 0 & 5 & 4 \\ 8 & 6 & 11 & -2 & 5 & -6 \\ 1 & 0 & 1 & 0 & 1 & 0 \end{pmatrix} \begin{pmatrix} 11 \\ -1 \\ 0 \\ 6 \\ -2 \\ 10 \end{pmatrix} = \begin{pmatrix} 42 \\ -23 \\ -23 \\ 19 \\ 0 \\ 9 \end{pmatrix}$$

and sends $$\begin{pmatrix} 42 \\ -23 \\ -23 \\ 19 \\ 0 \\ 9 \end{pmatrix}$$

to the second communication device.

The second communication device picks a secret element $y=(10, -5, 3, 0, -6, 1)$ in $R^6$. The second communication device computes the value of $A^t y$:

$$A^t y = \begin{pmatrix} 1 & 0 & -8 & 1 & 8 & 1 \\ 9 & 13 & 7 & 22 & 6 & 0 \\ -7 & 11 & 0 & 4 & 11 & 0 \\ 0 & 0 & 2 & 0 & -2 & 0 \\ 0 & 5 & 0 & 5 & 5 & 1 \\ 4 & 0 & 6 & 4 & -6 & 0 \end{pmatrix} \begin{pmatrix} 10 \\ -5 \\ 3 \\ 0 \\ -6 \\ 1 \end{pmatrix} = \begin{pmatrix} -61 \\ 10 \\ -190 \\ 18 \\ -54 \\ 94 \end{pmatrix}$$

and sends $$\begin{pmatrix} -61 \\ 10 \\ -190 \\ 18 \\ -54 \\ 94 \end{pmatrix}$$

to the first communication device.

The first communication device, upon receiving $A^t y$, computes the value of the cryptographic key $K_A$:

$$K_A = (x, A^t y) = (11 \; -1 \; 0 \; -2 \; 10) \begin{pmatrix} -61 \\ 10 \\ -190 \\ 18 \\ -54 \\ 94 \end{pmatrix} = 475.$$

The second communication device, upon receiving $Ax$, computes the value of the cryptographic key $K_B$:

$$K_B = (Ax, y) = (10 \; -5 \; 3 \; 0 \; -6 \; 1) \begin{pmatrix} 42 \\ -23 \\ -23 \\ 19 \\ 0 \\ 9 \end{pmatrix} = 475.$$

Thus, key agreement between the first and second communication devices have been securely and mutually established.

Symmetric Matrix Protocol

Figure 6:
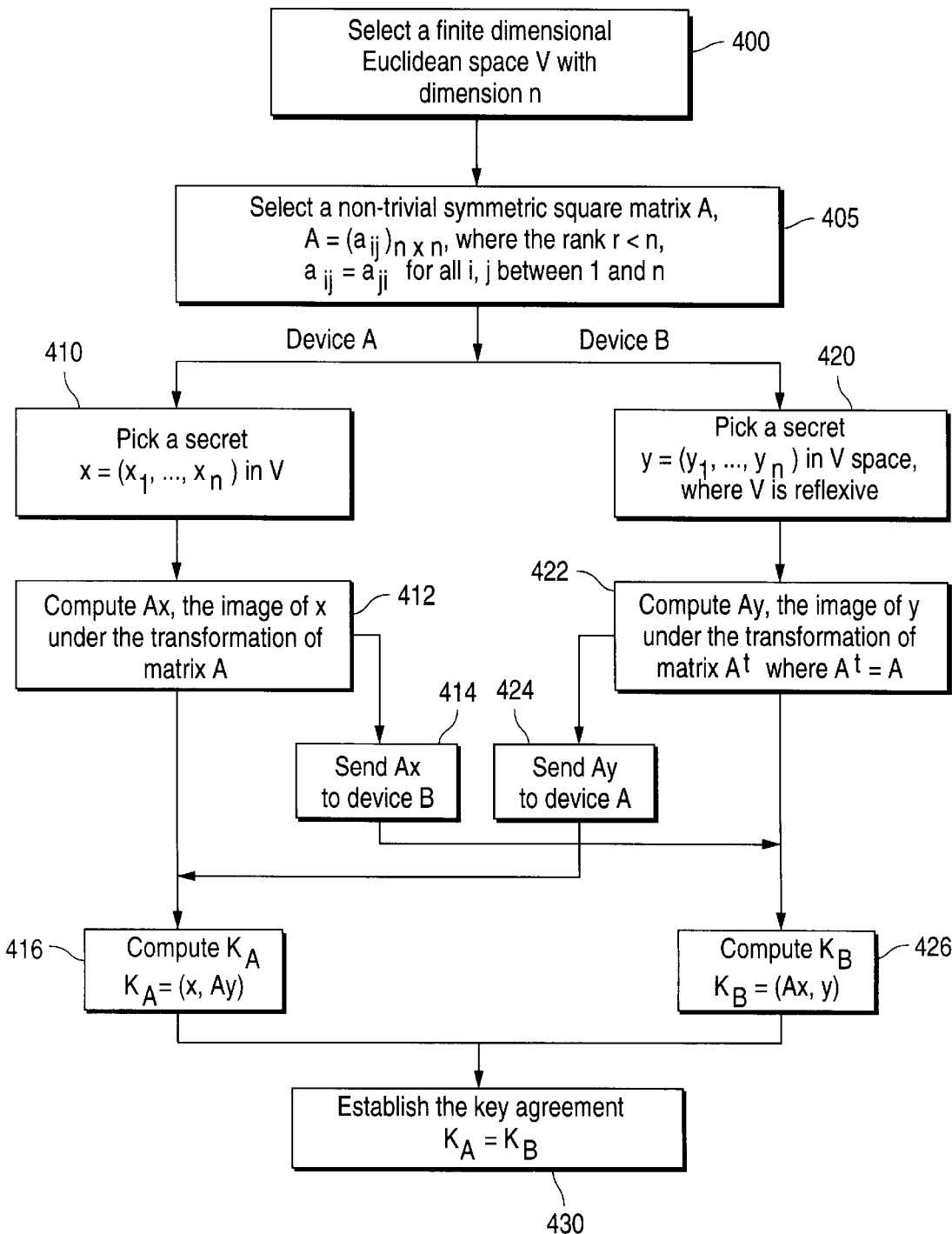
FIG. 6 is a flow diagram of a third embodiment of the general linear protocol implemented with a symmetric matrix in Euclidean spaces.

FIG. 6 is a flow diagram of a third embodiment of the present invention using a symmetric matrix. In this embodiment, a finite dimensional Euclidean space $V=R^n$, with dimension n, is selected. A non-trivial symmetric square matrix A is selected, where $A=(a_{ij})_{n \times n}$ such that the rank r is less than dimension n and $a_{ij}=a_{ji}$ for all i, j between 1 and n.

At step 410, communication device 10 picks a secret element $x=(x_1, x_2, \ldots, x_n)$ in space V. At step 412, communication device 10 computes the image of the element x under the transformation of the matrix A, i.e. the product of matrices A and x, denoted by Ax. At step 414, communication device 10 sends Ax to communication device 30. The matrix A is singular because the rank of A is less than n, thereby preventing others from deciphering the secret element x from its image Ax.

At step 420, communication device 30 picks a secret element $y=(Y_1, Y_2, \ldots, Y_n)$ in space V. At step 430, communication device 30 computes the image of the element y under the transformation defined by the matrix $A^t$, where $A^t=A$, denoted by Ay. At step 424, communication device 30 sends Ay to communication device 10. The matrix $A^t$ is singular because the rank of $A^t$ is less than n.

At step 416, communication device 10 computes the functional value $K_A=(x, Ay)$ as the value of the cryptographic key. At step 426, communication device 30 computes the functional value $K_B=(Ax, y)$ as the value of the cryptographic key. Because of the duality of A and $A^t$, $K_A$ and $K_B$ are equal. Thus, at step 430, communication devices 10 and 30 now established mutually key agreement between them.

The following numerical example illustrates key agreement under the protocol described above. In this example, 5-dimensional Euclidean spaces $V=R^5$ is selected. In addition, a matrix A is selected as follows:

$$A = \begin{pmatrix} 0 & -3 & 6 & 1 & 0 \\ -3 & 0 & 2 & -5 & 0 \\ 6 & 2 & 0 & 8 & 0 \\ 1 & -5 & 8 & 0 & 0 \\ 0 & 0 & 0 & 0 & 0 \end{pmatrix}$$

The rank of matrix A is 4.

Let the first communication device pick a secret element $x=(1, 20, 0, 0, 9)$ in $R^5$. The first communication device computes the value of Ax:

$$Ax = \begin{pmatrix} 0 & -3 & 6 & 1 & 0 \\ -3 & 0 & 2 & -5 & 0 \\ 6 & 2 & 0 & 8 & 0 \\ 1 & -5 & 8 & 0 & 0 \\ 0 & 0 & 0 & 0 & 0 \end{pmatrix} \begin{pmatrix} 1 \\ 20 \\ 0 \\ 0 \\ 9 \end{pmatrix} = \begin{pmatrix} -60 \\ -3 \\ 46 \\ -99 \\ 0 \end{pmatrix}$$

and sends $$\begin{pmatrix} -60 \\ -3 \\ 46 \\ -99 \\ 0 \end{pmatrix}$$

to the second communication device.

The second communication device picks a secret element y=(10, 0, −7, 0, −30) in $R^5$. The second communication device computes $A^t y$, note that $A^t = A$ since A is symmetric:

$$A^t y = \begin{pmatrix} 0 & -3 & 6 & 1 & 0 \\ -3 & 0 & 2 & -5 & 0 \\ 6 & 2 & 0 & 8 & 0 \\ 1 & -5 & 8 & 0 & 0 \\ 0 & 0 & 0 & 0 & 0 \end{pmatrix} \begin{pmatrix} -10 \\ 0 \\ 7 \\ 0 \\ -30 \end{pmatrix} = \begin{pmatrix} 42 \\ 44 \\ -60 \\ 46 \\ 0 \end{pmatrix}$$

and sends $$\begin{pmatrix} 42 \\ 44 \\ -60 \\ 46 \\ 0 \end{pmatrix}$$

to the first communication device.

The first communication device, upon receiving $A^t y$, computes the value of the first cryptographic key $K_A$:

$$K_A = (x, A^t y) = (1 \quad 20 \quad 0 \quad 0 \quad 9) \begin{pmatrix} 42 \\ 44 \\ -60 \\ 46 \\ 0 \end{pmatrix} = 922$$

The second communication device, upon receiving Ax, computes the value of the second cryptographic key $K_B$:

$$K_B = (Ax, y) = (-10 \quad 0 \quad 7 \quad 0 \quad -30) \begin{pmatrix} -60 \\ -3 \\ 46 \\ -99 \\ 0 \end{pmatrix} = 922$$

Therefore, key agreement between the first and second communication devices have been securely and mutually established.

Skew Symmetric Matrix Protocol

Figure 7:
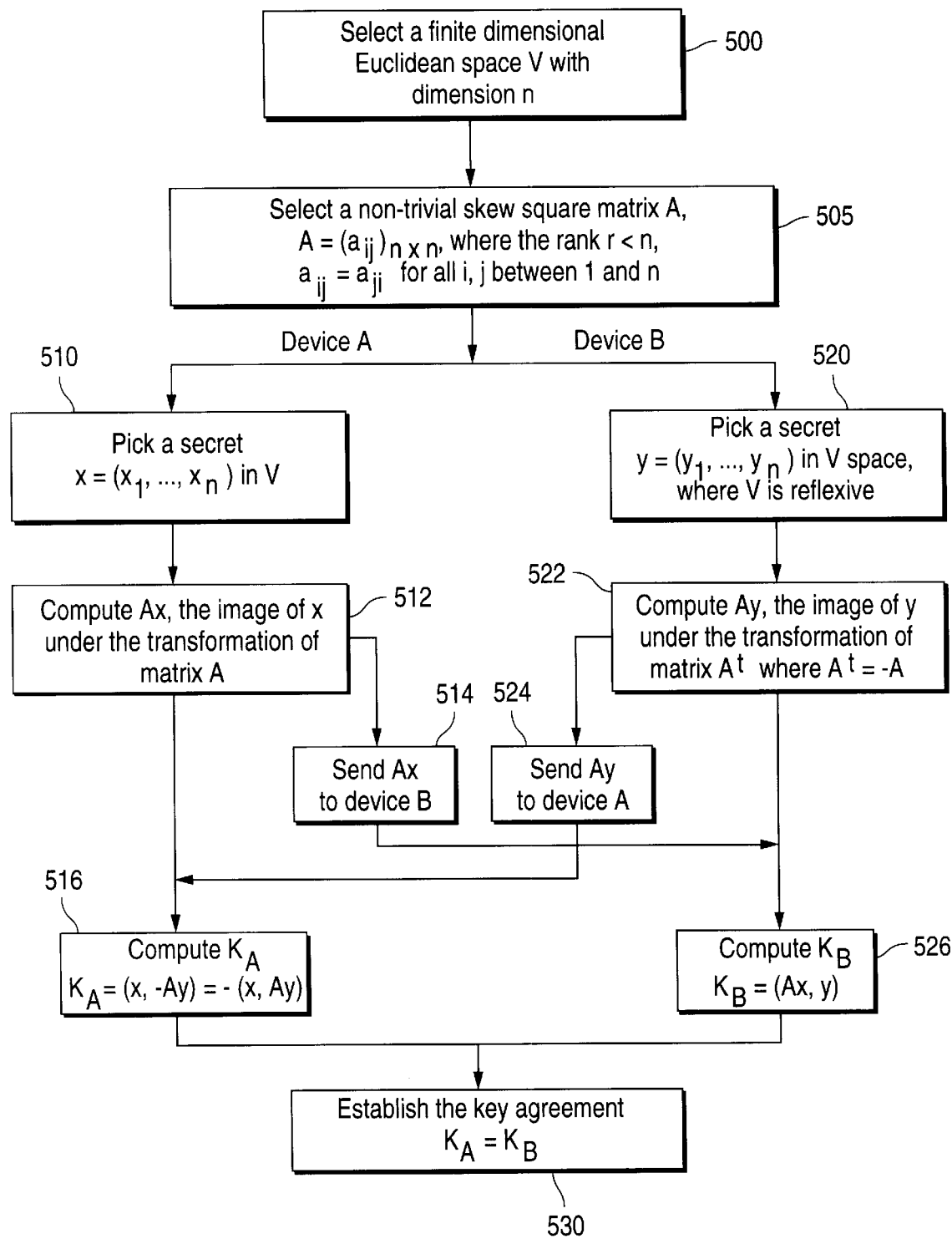
FIG. 7 is a flow diagram of a fourth embodiment of the general linear protocol implemented with a skew symmetric matrix in Euclidean spaces.

FIG. 7 is a flow diagram of a fourth embodiment of the present invention using a skew symmetric matrix. In this embodiment, a finite dimensional Euclidean space V, with dimension n, is selected. A skew symmetric matrix has the property $a_{ij} = -a_{ji}$, for all i and j between 1 and n. In other words, the matrix A is symmetric if and only if $-A = A^t$.

At step 510, communication device 10 picks a secret element $x=(x_1, x_2, \ldots, x_n)$ in V space. At step 512, communication device 10 computes the image of the element x under the transformation defined by the matrix A, i.e. the product of matrices A and x, denoted by Ax. At step 514, communication device 10 sends the value of Ax to communication device 30. The matrix A is singular because the rank of A is less than dimension n, thereby preventing others from deciphering the secret element x from its image Ax.

At step 520, communication device 30 picks a secret element $y=(Y_1, Y_2, \ldots, Y_m)$ in V space. At step 522, communication device 30 computes 522 the image of the element y under the transformation defined by the matrix $A^t$ or matrix −A, i.e. the product of matrices −A and y, denoted by −Ay. At step 524, communication device 30 sends the value of Ay to communication device 10. The matrix $A^t$ is singular because the rank of $A^t$ is less than n.

At step 516, communication device 10 computes the functional value $K_A = (x, -Ay) = -(x, Ay)$. At step 526, communication device 30 computes the functional value $K_B = (Ax, y)$. Because of the duality of A and $A^t$, $K_A$ and $K_B$ are equal. Thus, at step 530, communication devices 10 and 30 have established mutually key agreement between them.

The following numerical example illustrates key agreement using a skew symmetric matrix. In this example, 5-dimensional Euclidean spaces with $V=R^5$ is selected. In addition, a matrix A is selected as follows:

$$A = \begin{pmatrix} 0 & 3 & 6 & 1 & 0 \\ -3 & 0 & 2 & -5 & 0 \\ -6 & -2 & 0 & 8 & 0 \\ -1 & 5 & -8 & 0 & 0 \\ 0 & 0 & 0 & 0 & 0 \end{pmatrix}$$

The rank of the matrix A is 4.

The first communication device picks a secret element x=(5, −9, 1, 2, 11) in $R^5$. The first communication device computes Ax:

$$Ax = \begin{pmatrix} 0 & 3 & 6 & 1 & 0 \\ -3 & 0 & 2 & -5 & 0 \\ -6 & -2 & 0 & 8 & 0 \\ -1 & 5 & -8 & 0 & 0 \\ 0 & 0 & 0 & 0 & 0 \end{pmatrix} \begin{pmatrix} 5 \\ -9 \\ 1 \\ 2 \\ 11 \end{pmatrix} = \begin{pmatrix} -19 \\ 23 \\ 4 \\ -58 \\ 0 \end{pmatrix}$$

and sends $$\begin{pmatrix} -19 \\ 23 \\ 4 \\ -58 \\ 0 \end{pmatrix}$$

to the second communication device.

Let the second communication device pick a secret element y=(7, −10, 0, 3, 17) in $R^5$. The second communication device computes $A^t y$:

$$A^t y = \begin{pmatrix} 0 & -3 & -6 & -1 & 0 \\ 3 & 0 & -2 & 5 & 0 \\ 6 & 2 & 0 & -8 & 0 \\ 1 & -5 & 8 & 0 & 0 \\ 0 & 0 & 0 & 0 & 0 \end{pmatrix} \begin{pmatrix} 7 \\ -10 \\ 0 \\ 3 \\ 17 \end{pmatrix} = \begin{pmatrix} 27 \\ 36 \\ -2 \\ 57 \\ 0 \end{pmatrix}$$

and sends $A^t y =$ $$\begin{pmatrix} 27 \\ 36 \\ -2 \\ 57 \\ 0 \end{pmatrix}$$

to the first communication device.

The first communication device computes, upon receiving $A^t y$, the value of the cryptographic key $K_A$:

$$K_A = (x, A^t y) = (5\ -9\ 1\ 2\ 11) \begin{pmatrix} 27 \\ 36 \\ -2 \\ 57 \\ 0 \end{pmatrix} = 77$$

The second cryptographic subsystem computes, upon receiving Ax, the value of the cryptographic key $K_B$:

$$K_B = (Ax, y) = (7\ -10\ 0\ 3\ 17) \begin{pmatrix} -19 \\ 23 \\ 4 \\ -58 \\ 0 \end{pmatrix} = 77.$$

Therefore, key agreement between the first and second communication devices have been securely and mutually established.

Upper Triangular Square Matrix Protocol

Figure 8:
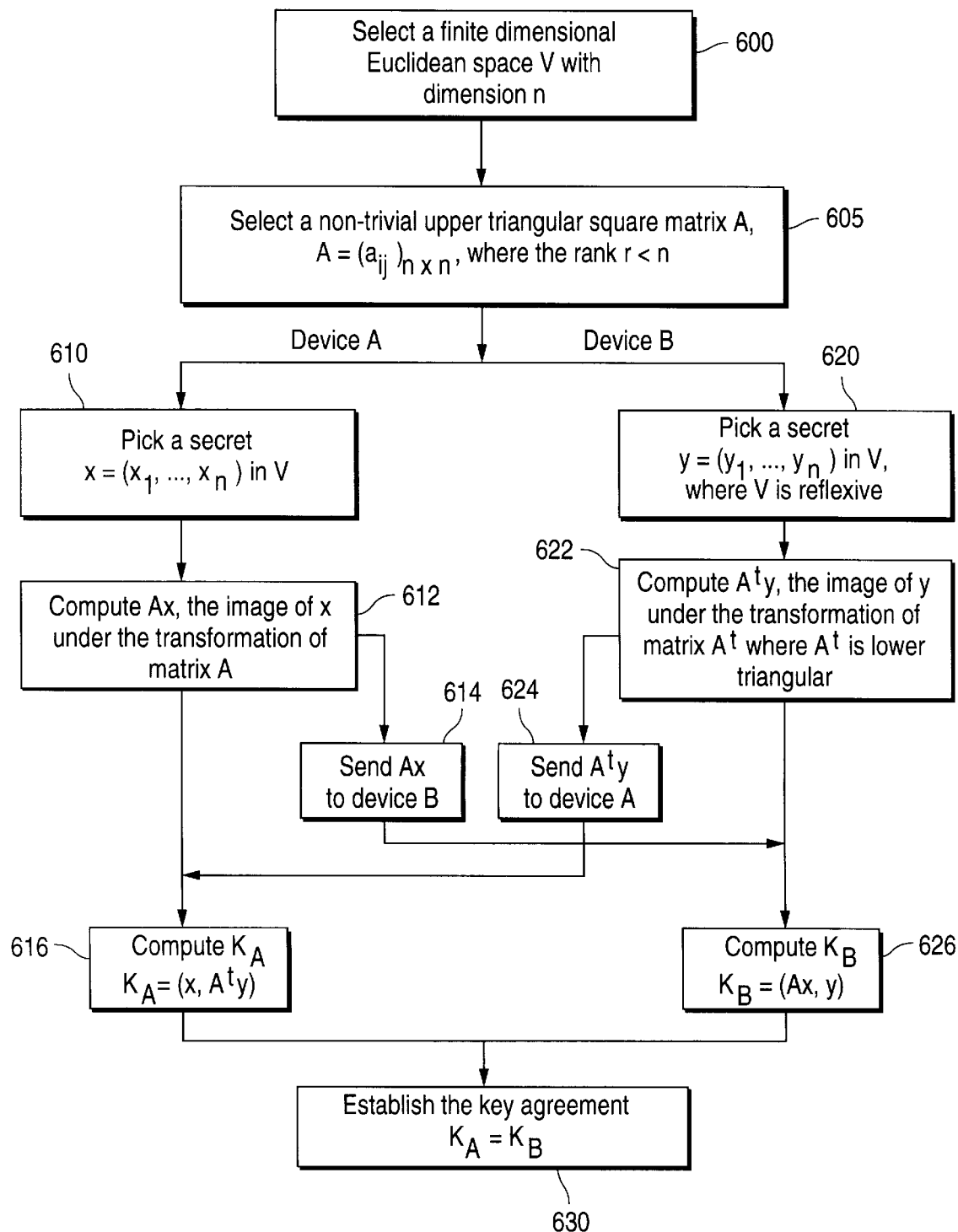
FIG. 8 is a flow diagram of a fifth embodiment of the general linear protocol implemented with an upper square matrix in Euclidean spaces.

FIG. 8 is a flow diagram of a fifth embodiment of the present invention using an upper square matrix. In this embodiment, a finite dimensional Euclidean space $V = R^n$, with dimension n, is selected. A non-trivial upper triangular square matrix A is selected, where $A = (a_{ij})_{n \times n}$ such that the rank r is less than dimension n. The dual or conjugate operator is $A^t$, which is the transpose of A, denoted by $A^t$.

At step 610, communication device 10 picks a secret element $x = (x_1, \ldots, x_n)$ in a Euclidean space $V_1$. At step 612, communication device 10 computes the image of the element x under the transformation of the matrix A, i.e. the product of matrices A and x, denoted by Ax. At step 614, communication device 10 sends the value of Ax to communication device 30. The matrix A is singular because the rank of A is less than n, thereby preventing others from deciphering the secret element x from its image Ax.

At step 620, communication device 30 picks a secret element $y = (y^1, \ldots, y_m)$ in space V, where space V is reflexive ($V = V^*$). At step 622, communication device 30 computes the image of the element y under the transformation as defined by the matrix $A^t$, i.e. the product of matrices $A^t$ and y, denoted by $A^t y$. At step 624, communication device 30 sends the value of $A^t y$ to communication device 10. The matrix $A^t$ is singular because the rank of $A^t$ is less than n.

At step 616, communication device 10 computes the functional value of the cryptographic key $K_A$ where $K_A = (x, A^t y)$. At step 626, communication device 30 computes the functional value of the cryptographic key $K_B$ where $K_B = (Ax, y)$. Because of the duality of A and $A^t$, $K_A$ and $K_B$ are equal. Thus, at step 230, communication devices 10 and 30 have established mutually key agreement between them.

The following numerical example illustrates key agreement under the protocol described above. In this example, 5-dimensional Euclidean spaces $V = R^5$ is selected. In addition, a non-trivial matrix A is selected as follows:

$$A = \begin{pmatrix} 6 & -2 & 4 & 7 & 1 \\ 0 & 5 & -1 & 9 & 0 \\ 0 & 0 & 3 & -1 & -5 \\ 0 & 0 & 0 & 7 & -2 \\ 0 & 0 & 0 & 0 & 0 \end{pmatrix}$$

The rank of the matrix A is 4.

The first communication device picks a secret element $x = (10, -1, 3, 0, 7)$ in $R^5$. The first communication device computes the value of Ax:

$$Ax = \begin{pmatrix} 6 & -2 & 4 & 7 & 1 \\ 0 & 5 & -1 & 9 & 0 \\ 0 & 0 & 3 & -1 & -5 \\ 0 & 0 & 0 & 7 & -2 \\ 0 & 0 & 0 & 0 & 0 \end{pmatrix} \begin{pmatrix} 10 \\ -1 \\ 3 \\ 0 \\ 7 \end{pmatrix} = \begin{pmatrix} 81 \\ -8 \\ -26 \\ -14 \\ 0 \end{pmatrix}$$

and sends $$\begin{pmatrix} 81 \\ -8 \\ -26 \\ -14 \\ 0 \end{pmatrix}$$

to the second communication device.

The second communication device picks a secret element $y = (4, 0, 9, 0, -8)$ in $R^5$. The second communication device computes the value of $A^t y$:

$$A^t y = \begin{pmatrix} 6 & 0 & 0 & 0 & 0 \\ -2 & 5 & 0 & 0 & 0 \\ 4 & -1 & 3 & 0 & 0 \\ 7 & 9 & -1 & 7 & 0 \\ 1 & 0 & -5 & -2 & 0 \end{pmatrix} \begin{pmatrix} 4 \\ 0 \\ 9 \\ 0 \\ -8 \end{pmatrix} = \begin{pmatrix} 24 \\ -8 \\ 43 \\ 19 \\ -41 \end{pmatrix}$$

and sends $$\begin{pmatrix} 24 \\ -8 \\ 43 \\ 19 \\ -41 \end{pmatrix}$$

to the first communication device.

The first communication device, upon receiving $A^t y$, computes the value of the cryptographic key $K_A$:

$$K_A = (x, A^t y) = (10\ -1\ 3\ 0\ 7) \begin{pmatrix} 24 \\ -8 \\ 43 \\ 19 \\ -41 \end{pmatrix} = 90.$$

The second communication device, upon receiving Ax, computes the value of the cryptographic key $K_B$:

$$K_B = (Ax, y) = \begin{pmatrix} 4 & 0 & 9 & 0 & -8 \end{pmatrix} \begin{pmatrix} -81 \\ -8 \\ -26 \\ -14 \\ 0 \end{pmatrix} = 90.$$

Therefore, key agreement between the first and second communication devices have been securely and mutually established.

Lower Triangular Square Matrix Protocol

Figure 9:
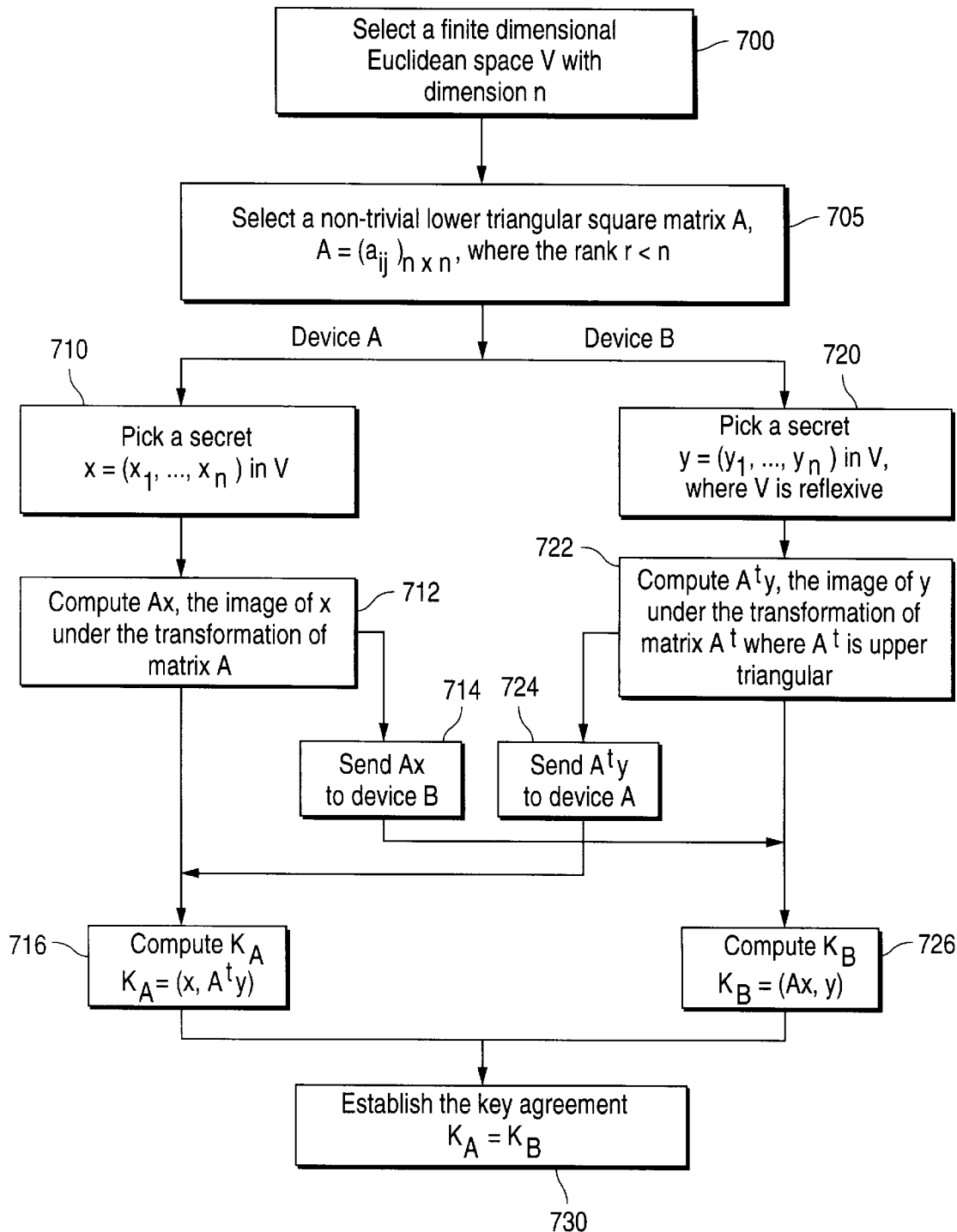
FIG. 9 is a flow diagram of a sixth embodiment of the general linear protocol implemented with a lower square matrix in Euclidean spaces.
Figure 10:
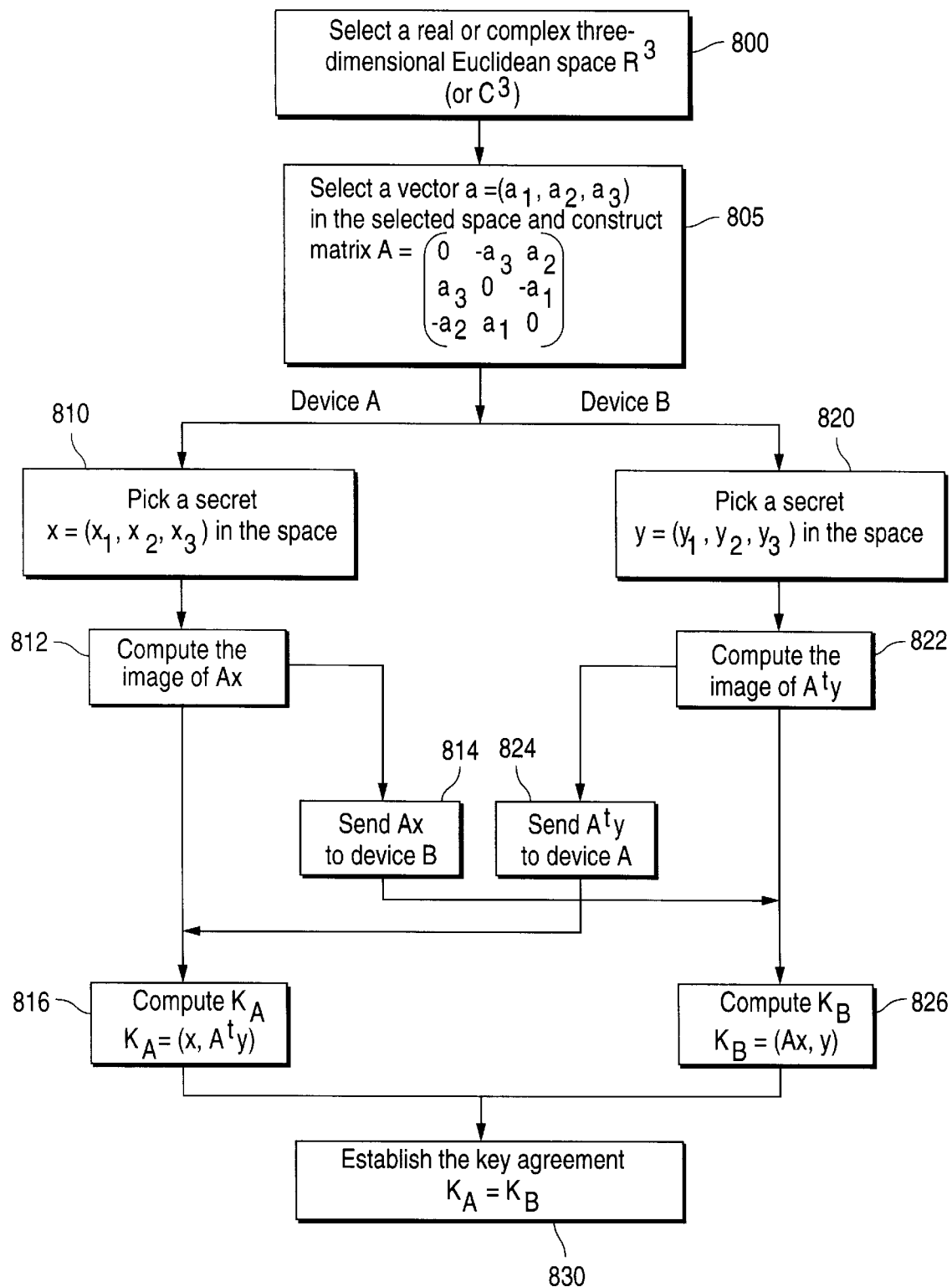
FIG. 10 is a flow diagram of a seventh embodiment of the general linear protocol implemented with a special type of skew symmetric matrices to generate a modified cross product in Euclidean spaces.

FIG. 9 is a flow diagram of a sixth embodiment of the present invention using a lower triangular square matrix protocol. In this embodiment, a finite dimensional Euclidean space $V=R^n$, with dimension n, is selected. In addition, a non-trivial lower triangular square matrix $A=(a_{ij})_{n \times n}$ is selected, where the rank r is less than the dimension n. The conjugate operator $A^t$ is the transpose of A. The conjugate operator $A^t$ must be an upper triangular.

At step 710, communication device 10 picks a secret element $x=(x_1, \ldots, x_n)$ in V space. At step 712, communication device 10 computes the image of the element x under the transformation as defined by the matrix A, i.e. the product of matrices and x, denoted by Ax. At step 714, communication device 10 sends Ax to communication device 30. The matrix A is singular because the rank of A is less than n, thereby preventing others from deciphering the secret element x from its image Ax.

At step 720, communication device 30 picks a secret element $y=(y_1, \ldots, y_n)$ in space V, where $V=V^*$. At step 722, communication device 30 computes the image of the element y under the transformation as defined by the matrix $A^t$, i.e. the product matrices $A^t$ and y, denoted by $A^t y$. At step 724, communication device 30 sends $A^t y$ to communication device 10. The matrix $A^t$ is singular because the rank of $A^t$ is less than n.

At step 716, communication device 10 computes the functional value of the cryptographic key $K_A$ where $K_A=(x, A^t y)$. At step 726, communication device 10 computes the functional value of the cryptographic key $K_B$ where $K_B=(Ax, y)$. Because of the duality of A and $A^t$, $K_A$ and $K_B$ are equal. Thus, at step 230, communication devices 10 and 30 have established mutually key agreement between them.

The following numerical example illustrates key agreement under the protocol described above. In this example, 5-dimensional Euclidean spaces $V=R^5$ are selected and a matrix A is selected as follows:

$$A = \begin{pmatrix} 6 & 0 & 0 & 0 & 0 \\ -2 & 5 & 0 & 0 & 0 \\ 4 & -1 & 3 & 0 & 0 \\ 7 & 9 & -1 & 7 & 0 \\ 1 & 0 & -5 & -2 & 0 \end{pmatrix}$$

The rank of the matrix A is 4.

Let the first communication device 10 select a secret element $x=(4, 0, 9, 0, -8)$ in $R^5$. The first communication device 10 computes the matrix Ax:

$$Ax = \begin{pmatrix} 6 & 0 & 0 & 0 & 0 \\ -2 & 5 & 0 & 0 & 0 \\ 4 & -1 & 3 & 0 & 0 \\ 7 & 9 & -1 & 7 & 0 \\ 1 & 0 & -5 & -2 & 0 \end{pmatrix} \begin{pmatrix} 4 \\ 0 \\ 9 \\ 0 \\ -8 \end{pmatrix} = \begin{pmatrix} 24 \\ -8 \\ 43 \\ 19 \\ -41 \end{pmatrix}$$

and sends $$\begin{pmatrix} 24 \\ -8 \\ 43 \\ 19 \\ -41 \end{pmatrix}$$

to the second communication device.

The second communication device selects a secret element $y=(10, -1, 3, 0, 7)$ in $R^5$. The second communication device computes the value of $A^t y$:

$$A^t y = \begin{pmatrix} 6 & -2 & 4 & 7 & 1 \\ 0 & 5 & -1 & 9 & 0 \\ 0 & 0 & 3 & -1 & -5 \\ 0 & 0 & 0 & 7 & -2 \\ 0 & 0 & 0 & 0 & 0 \end{pmatrix} \begin{pmatrix} 10 \\ -1 \\ 3 \\ 0 \\ 7 \end{pmatrix} = \begin{pmatrix} 81 \\ -8 \\ -26 \\ -14 \\ 0 \end{pmatrix}$$

and sends $$\begin{pmatrix} 81 \\ -8 \\ -26 \\ -14 \\ 0 \end{pmatrix}$$

to the first communication device.

The first communication device, upon receiving $A^t y$, computes the value of the cryptographic key $K_A$:

$$K_A(x, A^t y) = \begin{pmatrix} 4 & 0 & 9 & 0 & -8 \end{pmatrix} \begin{pmatrix} 81 \\ -8 \\ -26 \\ -14 \\ 0 \end{pmatrix} = 90.$$

The second communication device, upon receiving Ax, computes the value of the cryptographic key $K_B$:

$$K_B(Ax, y) = \begin{pmatrix} 10 & -1 & 3 & 0 & 7 \end{pmatrix} \begin{pmatrix} 24 \\ -8 \\ 43 \\ 19 \\ -41 \end{pmatrix} = 90.$$

Therefore, key agreement between the first and second communication devices have been securely and mutually established.

Modified Cross Product Protocol

A particular method of simplifying the computational complexity using the cross product protocol, without using exponential, modular arithmetic, prime numbers, or other complex computations, is discussed in the inventors' previous U.S. Pat. No. 5,583,939 (the '939 patent) entitled "SECURE, SWIFT CRYPTOGRAPHIC KEY EXCHANGE" issued on Dec. 10, 1996, to C. N. Chang, C. K. Yuan, and F. Q. Hao, which is incorporated herein by reference in its entirety. The '939 patent discloses a key exchange protocol implemented with a cross product, which requires computing the absolute values of the mixed products A modified cross product protocol performs the calculations without computing the absolute values. The modified cross product protocol disclosed in this patent application is a significant improvement in the cross product protocol discussed in the inventors' previous patent. The calculations of absolute values are unnecessary using this protocol.

The modified cross product protocol disclosed in this patent application is a significant improvement in the cross product protocol discussed in the inventors previous patent. The calculations of absolute values are unnecessary using this protocol. A three dimensional Euclidean space $V=R^3$, is selected. A non-trivial element $a=(a_1, a_2, a_3)$ in space V is selected. Based on the non-trivial element $a=(a_1, a_2, a_3)$, a matrix A is constructed as follows:

$$A = \begin{pmatrix} 0 & -a_3 & a_2 \\ a_3 & 0 & -a_1 \\ -a_2 & a_1 & 0 \end{pmatrix}$$

At step 810, communication device 10 picks a secret $x=(x_1, X_2, X_3)$ in the space V. At step 812, communication device 10 computes the product $Ax=a \times x$. At step 814, communication device 10 sends Ax to communication device 30.

At step 820, communication device 30 picks the secret $y=(Y_1, Y_2, Y_3)$. At step 822, communication device 30 computes $A^t$, the product $A^t y=-a \times y$. At step 824, communication device 30 sends $A^t y$ to communication device 10.

At step 816, communication device 10 computes the functional value $K_a=(x, Ay)$. At step 826, communication device 30 computes the functional value $K_B=(A^t x, y)$. Because of the duality of A and $A^t$, $K_A$ and $K_B$ are equal. Thus, at step 230, communication devices 10 and 30 have established mutually key agreement between them.

The following numerical example illustrates key agreement under the protocol described above. In this example, a real 3-dimensional Euclidean space $V=R^3$ and a non-trivial element $a=(2, 4, 7)$ are selected. By using the selected non-trivial element a, a matrix A is constructed as follows:

$$\begin{pmatrix} 0 & -7 & 4 \\ 7 & 0 & -2 \\ -4 & 2 & 0 \end{pmatrix}$$

Let the first communication device pick a secret element $x=(4, 0, 9)$ in $R^3$. The first communication device computes the product Ax:

$$Ax = \begin{pmatrix} 0 & -7 & 4 \\ 7 & 0 & -2 \\ -4 & 2 & 0 \end{pmatrix} \begin{pmatrix} 4 \\ 0 \\ 9 \end{pmatrix} = \begin{pmatrix} 36 \\ 10 \\ -16 \end{pmatrix}$$

and sends Ax=

$$\begin{pmatrix} 36 \\ 10 \\ -16 \end{pmatrix}$$

to the second communication device.

The second communication device picks a secret element $y=(-1, 3, 0)$ in $R^3$. The second communication device computes the image $A^t y$:

$$A^t y = \begin{pmatrix} 0 & 7 & -4 \\ -7 & 0 & 2 \\ 4 & -2 & 0 \end{pmatrix} \begin{pmatrix} -1 \\ 3 \\ 0 \end{pmatrix} = \begin{pmatrix} 21 \\ 7 \\ -10 \end{pmatrix}$$

and sends $A^t y$=

$$\begin{pmatrix} 21 \\ 7 \\ -10 \end{pmatrix}$$

to the first communication device.

The first communication device, upon receiving $A^t y$, computes the value of the cryptographic key $K_A$:

$$K_A = (x, A^t y) = (4 \quad 0 \quad 9) \begin{pmatrix} 21 \\ 7 \\ -10 \end{pmatrix} = -6$$

The second communication device, upon receiving Ax, computes the value of the cryptographic key $K_B$:

$$K_B = (Ax, y) = (-1 \quad 3 \quad 0) \begin{pmatrix} 36 \\ 10 \\ -16 \end{pmatrix} = -6$$

Therefore, key agreement between the first and second communication devices have been securely and mutually established. To increase the robustness of the protocol, parties may employ larger row and column matrices.

Sequential Key Protocol

Figure 11:
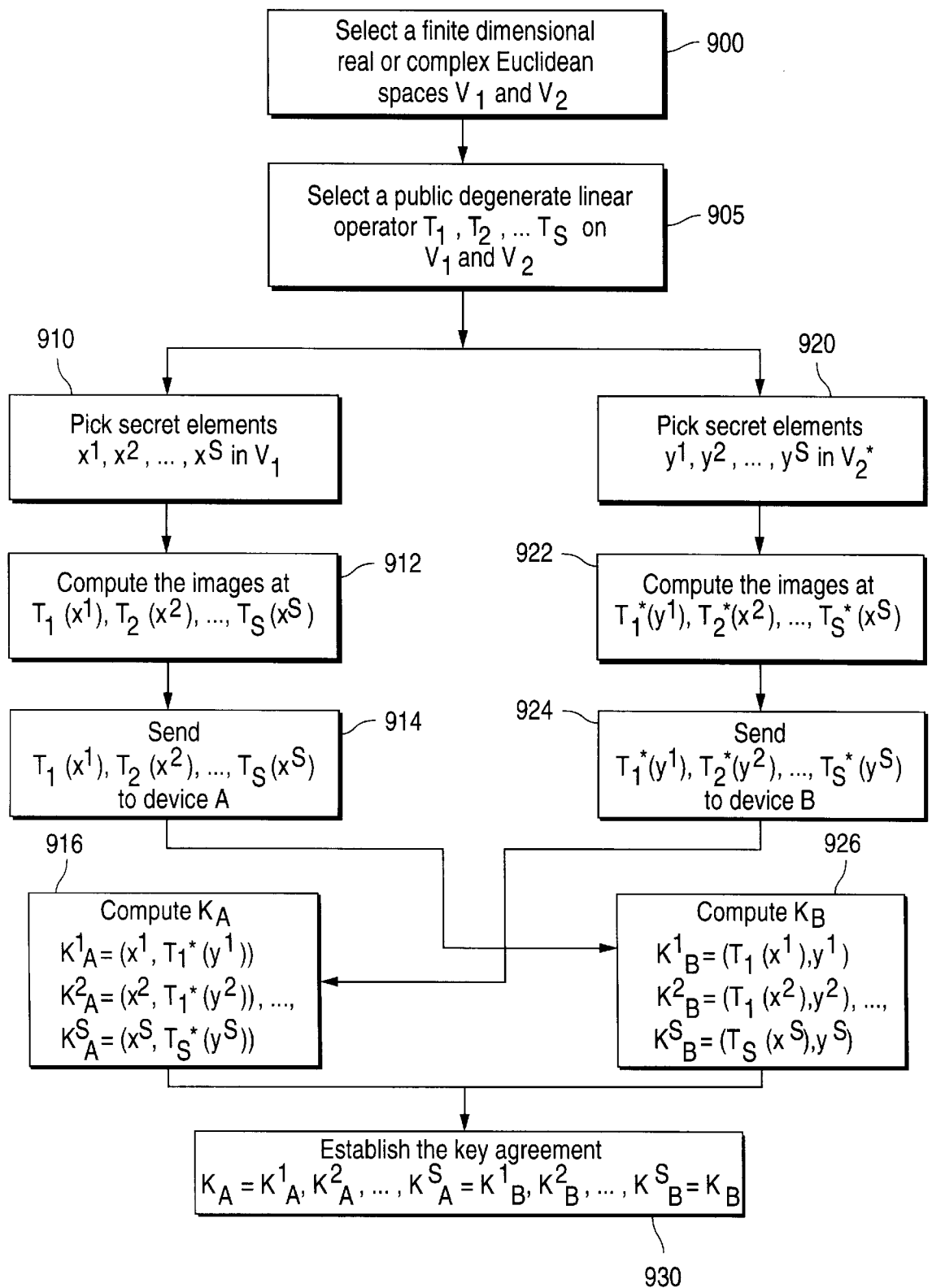
FIG. 11 is a flow diagram of an eighth embodiment of the general linear protocol implemented with a series of matrices to generate a sequential key in Euclidean spaces.

FIG. 11 is a flow diagram of an eighth embodiment of the present invention using a sequential key protocol. A sequential key is a key consisting of a sequence of values. In this embodiment, finite dimensional real or complex Euclidean spaces $V_1$ and $V_2$ and non-trivial singular linear operators $T^1, T_2, \ldots T_s$ mapping from $V_1$ into $V_2$ are selected.

At step 910, communication device 10 picks s secret elements $x^1, x^2, \ldots, x^s$ in $V_1$ space. At step 912, communication device 10 computes the images $T_1(x^1), T_2(x^2), \ldots, T_s(x^s)$ At step 914, communication device 10 sends $T_1(x_1), T_2(x^2), \ldots, T_s(x^s)$ to communication device 30.

At step 920, communication device 30 picks s secret elements $y^1, y^2, \ldots, y^s$ in space $V_2$. At step 922, communication device 30 computes the images at $T_1^*(y^1), T_2^*(y^2), \ldots, T_s^*(y^s)$. At step 926, communication device 30 sends $T_1^*(y^1), T_2^*(y^2), \ldots, T_s^*(y^s)$ to communication device 10.

Communication device 10, upon receiving $T_1(x_1), T_2(x^2), \ldots, T_s(x^s)$, computes the values of the cryptographic key $K_A$:

$K_A = K^1_A, K^2_A, \ldots K^s_A,$ where $K^1_A=(x^1, T_1*(y^1))$, $K^2_A=(x^2, T_2*(y^2))$, ..., $K^s_A=(x^s, T_s*(y^s))$ Communication device 30, upon receiving $T_1(x^1)$, $T_2(x^2)$, ..., $T_s(x^s)$, computes the values of the cryptographic key $K_B$.

$K_B = K^1_B, K^2_B, ... K^s_B$, where $K^1_B=(x^1, T_1*(y^1))$, $K^2_B=(x^2, T_2*(y^2))$, ..., $K^s_B=(x^s, T_s*(y^s))$ Because of the duality of each pair $T_i$ and $T_i*$, $K^i_A$ and $K^i_B$ are equal for all i between 1 and s. Thus, at step 930, communication devices 10 and 30 have established mutually sequential key agreement between them.

The following numerical example illustrates key agreement under the protocol described above. In this example, 5-dimensional Euclidean spaces $R^5$ are selected. In addition, non-secret matrices $A^1$, $A^2$, and $A^3$ are selected as follows:

$$A^1 = \begin{pmatrix} 0 & -3 & 6 & 1 & 0 \\ -3 & 0 & 2 & -5 & 0 \\ 6 & 2 & 0 & 8 & 0 \\ 1 & -5 & 8 & 0 & 0 \\ 0 & 0 & 0 & 0 & 0 \end{pmatrix} A^2 = \begin{pmatrix} 0 & 3 & 6 & 1 & 0 \\ -3 & 0 & 2 & -5 & 0 \\ -6 & -2 & 0 & 8 & 0 \\ -1 & 5 & -8 & 0 & 0 \\ 0 & 0 & 0 & 0 & 0 \end{pmatrix},$$

$$A^3 = \begin{pmatrix} 6 & -2 & 4 & 7 & 1 \\ 0 & 5 & -1 & 9 & 0 \\ 0 & 0 & 3 & -1 & -5 \\ 0 & 0 & 0 & 7 & -2 \\ 0 & 0 & 0 & 0 & 0 \end{pmatrix}.$$

The ranks of $A^1$, $A^2$, and $A^3$ are 4.

Let the first communication device pick three secret elements: $x^1=(1, 20, 0, 0, 9)$, $x^2=(5, -9, 1, 2, 11)$, and $x^3=(10, -1, 3, 0, 7)$ in $R^5$. The first communication device computes the values:

$$A^1 x^1 = \begin{pmatrix} 0 & -3 & 6 & 1 & 0 \\ -3 & 0 & 2 & -5 & 0 \\ 6 & 2 & 0 & 8 & 0 \\ 1 & -5 & 8 & 0 & 0 \\ 0 & 0 & 0 & 0 & 0 \end{pmatrix} \begin{pmatrix} 1 \\ 20 \\ 0 \\ 0 \\ 9 \end{pmatrix} = \begin{pmatrix} -60 \\ -3 \\ 46 \\ -99 \\ 0 \end{pmatrix}$$

$$A^2 x^2 = \begin{pmatrix} 0 & 3 & 6 & 1 & 0 \\ -3 & 0 & 2 & -5 & 0 \\ -6 & -2 & 0 & 8 & 0 \\ -1 & -5 & -8 & 0 & 0 \\ 0 & 0 & 0 & 0 & 0 \end{pmatrix} \begin{pmatrix} 5 \\ -9 \\ 1 \\ 2 \\ 11 \end{pmatrix} = \begin{pmatrix} -19 \\ 23 \\ 4 \\ -58 \\ 0 \end{pmatrix}$$

$$A^3 x^3 = \begin{pmatrix} 6 & -2 & 4 & 7 & 1 \\ 0 & 5 & -1 & 9 & 0 \\ 0 & 0 & 3 & -1 & -5 \\ 0 & 0 & 0 & 7 & -2 \\ 0 & 0 & 0 & 0 & 0 \end{pmatrix} \begin{pmatrix} 10 \\ -1 \\ 3 \\ 0 \\ 7 \end{pmatrix} = \begin{pmatrix} 81 \\ -8 \\ -26 \\ -14 \\ 0 \end{pmatrix}$$

and sends $$\begin{pmatrix} -60 \\ -3 \\ 46 \\ -99 \\ 0 \end{pmatrix}, \begin{pmatrix} -19 \\ 23 \\ 4 \\ -58 \\ 0 \end{pmatrix}, \begin{pmatrix} 81 \\ -8 \\ -26 \\ -14 \\ 0 \end{pmatrix}$$

to the second communication device.

The second communication device picks three secret elements: $y^1=(10\ 0\ -7\ 0\ -30)$, $y^2=(7, -10, 0, 3, 17)$, and $y^3=(4, 0, 9, 0, -8)$ in $R^5$. The second communication device computes the values:

$$(A^1)^t y^1 = \begin{pmatrix} 0 & -3 & 6 & 1 & 0 \\ -3 & 0 & 2 & -5 & 0 \\ 6 & 2 & 0 & 8 & 0 \\ 1 & -5 & 8 & 0 & 0 \\ 0 & 0 & 0 & 0 & 0 \end{pmatrix} \begin{pmatrix} -10 \\ 0 \\ 7 \\ 0 \\ -30 \end{pmatrix} = \begin{pmatrix} 42 \\ 44 \\ -60 \\ 46 \\ 0 \end{pmatrix}$$

$$(A^2)^t y^2 = \begin{pmatrix} 0 & -3 & -6 & -1 & 0 \\ 3 & 0 & -2 & 5 & 0 \\ 6 & 2 & 0 & -8 & 0 \\ 1 & -5 & 8 & 0 & 0 \\ 0 & 0 & 0 & 0 & 0 \end{pmatrix} \begin{pmatrix} 7 \\ -10 \\ 0 \\ 3 \\ 17 \end{pmatrix} = \begin{pmatrix} 27 \\ 36 \\ -2 \\ 57 \\ 0 \end{pmatrix}$$

$$(A^3)^t y^3 = \begin{pmatrix} 6 & 0 & 0 & 0 & 0 \\ -2 & 5 & 0 & 0 & 0 \\ 4 & -1 & 3 & 0 & 0 \\ 7 & 9 & -1 & 7 & 0 \\ 1 & 0 & -5 & -2 & 0 \end{pmatrix} \begin{pmatrix} 4 \\ 0 \\ 9 \\ 0 \\ -8 \end{pmatrix} = \begin{pmatrix} 24 \\ -8 \\ 43 \\ 19 \\ -41 \end{pmatrix}$$

and sends $$\begin{pmatrix} 44 \\ 42 \\ -60 \\ 46 \\ 0 \end{pmatrix}, \begin{pmatrix} 27 \\ 36 \\ -2 \\ 57 \\ 0 \end{pmatrix}, \begin{pmatrix} 24 \\ -8 \\ 43 \\ 19 \\ -41 \end{pmatrix}$$

to the first communication device.

The first communication device, upon receiving $(A^i)^t y^i$ for i=1,2,3, computes the values of the cryptographic key $K_A$:

$$K^1_A = (x^1, (A^1)^t y^1) = (1\ 20\ 0\ 0\ 9) \begin{pmatrix} 44 \\ 42 \\ -60 \\ 46 \\ 0 \end{pmatrix} = 922,$$

$$K^2_A = (x^2, (A^2)^t y^2) = (5\ -9\ 1\ 2\ 11) \begin{pmatrix} 27 \\ 36 \\ -2 \\ 57 \\ 0 \end{pmatrix} = 77,$$

-continued $$K_A^3 = (x^3, (A^3)^t y^3) = \begin{pmatrix} 10 & -1 & 3 & 0 & 7 \end{pmatrix} \begin{pmatrix} 24 \\ -8 \\ 43 \\ 19 \\ -41 \end{pmatrix} = 90.$$

The second communication device, upon receiving $A^i x^i$ for i=1,2,3, computes the values of the cryptographic key $K_B$:

$$K_B^1 = (A^1 x^1, y^1) = \begin{pmatrix} -10 & 0 & 7 & 0 & -30 \end{pmatrix} \begin{pmatrix} -60 \\ -3 \\ 46 \\ -99 \\ 0 \end{pmatrix} = 922,$$

$$K_B^2 = (A^2 x^2, y^2) = \begin{pmatrix} 7 & -10 & 0 & 3 & 17 \end{pmatrix} \begin{pmatrix} -19 \\ 23 \\ 4 \\ -58 \\ 0 \end{pmatrix} = 77,$$

$$K_B^3 = (A^3 x^3, y^3) = \begin{pmatrix} 4 & 0 & 9 & 0 & -8 \end{pmatrix} \begin{pmatrix} 81 \\ -8 \\ -26 \\ -14 \\ 0 \end{pmatrix} = 90.$$

Therefore, sequential key agreement between the first and second communication devices have been securely and mutually established, with $K_A=(K^1_A, K^2_A, K^3_A)=(922, 77, 90)=(K^1_B, K^2_B, K^3_B)=K_B$. To increase the robustness of the protocol, parties may employ secret elements with larger components.

Circulant Matrix Protocol

Figure 12:
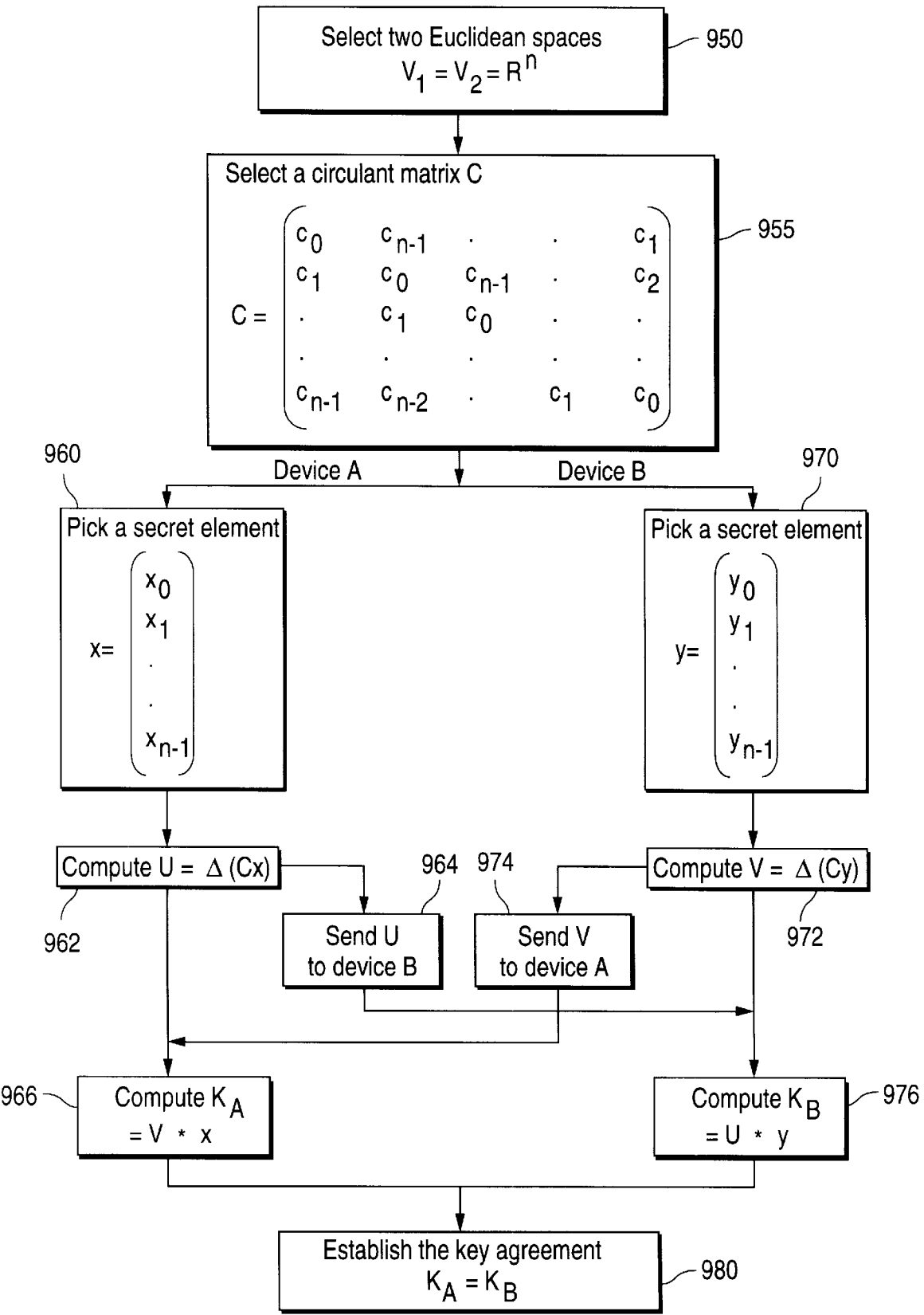
FIG. 12 is a flow diagram of a ninth embodiment of the general linear protocol implemented with a combination of circulant matrices in Euclidean spaces.

FIG. 12 is a flow diagram of a ninth embodiment of the present invention using a combination of circulant matrices. In this embodiment, a finite dimensional Euclidean space $V=R^n$, with dimension n, is selected. Two non-trivial circulant matrices, linear difference operator $\Delta$ and a constant-diagonal matrix C, are selected where $$\Delta = \begin{pmatrix} 1 & -1 & 0 & 0 \\ 0 & 1 & -1 & 0 \\ 0 & 0 & 1 & 0 \\ \vdots & \vdots & \vdots & \vdots \\ -1 & 0 & 0 & 1 \end{pmatrix} \text{ and } C = \begin{pmatrix} c_0 & c_{n-1} & \ldots & \ldots & c_1 \\ c_1 & c_0 & c_{n-1} & \ldots & c_2 \\ \ldots & c_1 & c_0 & \ldots & \ldots \\ \vdots & \vdots & \vdots & \vdots & \vdots \\ c_{n-1} & c_{n-2} & \ldots & \ldots & c_0 \end{pmatrix}$$

such that $c_0, c_1, \ldots, c_{n-1}$ are non-zero, and $c_0 = -(c_1 + \ldots + c_{n-1})$. Thus, the ranks of both $\Delta$ and C are less than dimension n.

At step 960, communication device 10 picks a secret element $x=(x_1, x_2, \ldots, x_n)$ in space V. At step 962, communication device 10 computes the image of the element x under the transformations of the matrix C and then, followed by matrix $\Delta$, i.e. the product of matrices $\Delta$, C and x, denoted by $U=\Delta(Cx)$. At step 964, communication device 10 sends $U=\Delta(Cx)$ to communication device 30. The matrices $\Delta$ and C are both singular because the ranks of $\Delta$ and C are both less than n.

At step 970, communication device 30 picks a secret element $y=(Y_1, Y_2, \ldots, Y_n)$ in space V. At step 972, communication device 30 computes the image of the element y under the transformations of matrix C and then, computes Cy under the transformation of matrix $\Delta$, denoted by $V=\Delta(Cy)$. At step 974, communication device 30 sends $V=\Delta(Cy)$ to communication device 10. The matrices $\Delta$ and C are both singular because the ranks of $\Delta$ and C are both less than n, thereby preventing others from deciphering the secret element y from its image $V=\Delta(Cy)$.

At step 966, communication device 10 computes the functional value $K_A=(x, V)=x*V$, where "x" is the convolution operation defined below, as the values of the cryptographic sequential key. At step 976, communication device 30 computes the functional value $K_B=(U, y)=U*y$ as the values of the cryptographic sequential key. Because of the duality of $\Delta$ and C, $K_A$ and $K_B$ are equal. Thus, at step 980, communication devices 10 and 30 have established mutually key agreement between them.

For two elements x and y in n-dimensional Euclidean space $R^n$, $x*y$ is defined to be a new element in the same space by $$X * y = \begin{pmatrix} x_0 y_0 + x_1 y_{n-1} + x_2 y_{n-2} + \ldots + x_{n-1} y_1 \\ x_0 y_1 + x_1 y_0 + x_2 y_{n-1} + \ldots + x_{n-1} y_2 \\ \vdots \\ x_0 y_{n-1} + x_1 y_{n-2} + x_2 y_{n-3} + \ldots + x_{n-1} y_0 \end{pmatrix}$$

The following numerical example illustrates key agreement under the protocol described above. In this example, 3-dimensional Euclidean spaces $V=R^3$ is selected. In addition, the circulant matrices $\Delta$ and C are selected as follows:

$$\Delta = \begin{pmatrix} 1 & -1 & 0 \\ 0 & 1 & -1 \\ -1 & 0 & 1 \end{pmatrix} \text{ and } C = \begin{pmatrix} 3 & -2 & -1 \\ -1 & 3 & -2 \\ -2 & -1 & 3 \end{pmatrix}$$

The ranks of matrix $\Delta$ and matrix C are both 2.

Let the first communication device pick a secret element x=

$$\begin{pmatrix} 20 \\ 10 \\ 15 \end{pmatrix}$$

in $R^3$. The first communication device computes the value U:

$$U = \Delta(Cx) = \Delta \begin{pmatrix} 3 & -2 & -1 \\ -1 & 3 & -2 \\ -2 & -1 & 3 \end{pmatrix} \begin{pmatrix} 20 \\ 10 \\ 15 \end{pmatrix} = \Delta \begin{pmatrix} 25 \\ -20 \\ -5 \end{pmatrix} = \begin{pmatrix} 45 \\ -15 \\ -30 \end{pmatrix}$$

and sends U to the second communication device.

The second communication device picks a secret element y=

$$\begin{pmatrix} 15 \\ 25 \\ 12 \end{pmatrix}$$

in $R^3$. The second communication device computes V, $$V = \Delta(Cy) = \Delta \begin{pmatrix} 3 & -2 & -1 \\ -1 & 3 & -2 \\ -2 & -1 & 3 \end{pmatrix} \begin{pmatrix} 15 \\ 25 \\ 12 \end{pmatrix} = \Delta \begin{pmatrix} -17 \\ 36 \\ -19 \end{pmatrix} = \begin{pmatrix} -53 \\ 55 \\ -2 \end{pmatrix}$$

and sends V to the first communication device.

The first communication device, upon receiving V, computes the values of the first cryptographic sequential key $K_A$:

$$K_A = (x, V)x * V = \begin{pmatrix} -53 \\ 55 \\ -2 \end{pmatrix} * \begin{pmatrix} 20 \\ 10 \\ 15 \end{pmatrix} = \begin{pmatrix} -255 \\ 540 \\ -285 \end{pmatrix}$$

The second communication device, upon receiving U, computes the values of the second sequential cryptographic key $K_B$:

$$K_B = (U, y) = U * y = \begin{pmatrix} 45 \\ -15 \\ -30 \end{pmatrix} * \begin{pmatrix} 15 \\ 25 \\ 12 \end{pmatrix} = \begin{pmatrix} -255 \\ 540 \\ -285 \end{pmatrix}$$

Therefore, a sequential key agreement k=−255, 540, −285 between the first and second communication devices have been securely and mutually established.

The embodiments described above are only illustrative of the principles of this invention and are not intended to limit the invention to the particular embodiments disclosed. Numerous variations and modifications are possible within the scope of the present invention. For example, the general linear protocol of the present invention can be extended to any linear operator having singularity characteristics. Furthermore, in view of this disclosure, those skilled in the art would appreciate that other types of matrices could be adopted to establish key agreement while keeping the secret elements private. The present invention is defined by the following claims.

We claim:

1. A method for establishing key agreement between a first device and a second device over a communication channel, comprising the steps of:
  selecting a Euclidean space $V_1$ with a finite dimension n and a Euclidean space $V_2$ with a finite dimension m, space $V_1$ having a dual space $V_1^* = V_1$, and space $V_2^*$ having a dual space $V_2^* = V_2$;
  selecting a degenerate linear operator T represented by a mXn rectangular matrix A with rank less then n, mapping space $V_1$ into space $V_2$, and its conjugate operator $T^*$ represented by a matrix $A^t$ with rank less than m, mapping space $V_2$ into space $V_1$;
  selecting in the first device, a secret element x in space $V_1$;
  selecting in the second device, a secret element y in the space $V_2$;
  sending the value Ax from the first device to the second device;
  sending the value $A^t y$ from the second device to the first device;
  computing in the first device the value of the functional (x, $A^t y$);
  computing in the second device the value of the functional (Ax, y);
  using the value (x, $A^t y$) as the encryption key when sending a message from the first device to the second device, or the decryption key for the first device when receiving a ciphertext from the second device; and
  using as an encryption key (Ax, y) when sending a message from the second device to the first device, or the decryption key for the second device when receiving a ciphertext from the first device.

2. A method as in claim 1, wherein $V_1$, $V_2$ are Euclidean spaces, and singular matrices A and $A^t$ are square matrices.

3. A method as in claim 1, wherein $V_1$, $V_2$ are Euclidean spaces, and matrices A and $A^t$ are symmetric square matrices.

4. A method as in claim 1, wherein $V_1$, $V_2$ are Euclidean spaces, and matrices A and $A^t$ are skew symmetric square matrices.

5. A method as in claim 1, wherein $V_1$, $V_2$ are Euclidean spaces, and matrices A and $A^t$ are singular upper triangular and lower triangular square matrices respectively.

6. A method as in claim 1, wherein $V_1$, $V_2$ are Euclidean spaces, and matrices A and $A^t$ are singular lower triangular and upper triangular square matrices respectively.

7. A method as in claim 1, wherein $V_1$, $V_2$ are Euclidean spaces, and matrices A and $A^t$ are cross product matrices.

8. A method as in claim 1, wherein $V_1$, $V_2$ are Euclidean spaces, and a sequence of singular square matrices are employed to generate a sequential key.

9. A method as in claim 1, wherein $V_1$, $V_2$ are Euclidean spaces, and matrices A and $A^t$ are both the product of linear difference operator $\Delta$ and constant-diagonal circulant matrix C.

10. The method of claim 1, wherein said rectangular matrices A and $A^t$ are each represented in the form of a sequence of numbers: $a_{11}, a_{12}, \ldots, a_{1n}; a_{21}, a_{22}, \ldots, 2_{2n}; \ldots, a_{m1}, a_{m2}, \ldots, a_{mn}$.

11. The method of claim 2, wherein said square matrix A and $A^t$ are each represented in the form of a sequence of numbers: $a_{11}, a_{12}, \ldots, a_{1n}; a_{21}, a_{22}, \ldots, a_{2n}; a_{n1}, a_{n2}, \ldots, a_{nn}$.

12. The method of 3, wherein said matrix A and $A^t$ are each represented in the form of a sequence of numbers: $a_{11}, a_{12}, \ldots, a_{1n}; a_{22}, a_{23}, \ldots, a_{2n}; \ldots; a_{nn}$.

13. The method of claim 4, wherein said matrix A and $A^t$ are each represented in the form of a sequence of numbers: $0, a_{12}, \ldots, a_{1n}; 0, a_{23}, \ldots, a_{2n}; \ldots; 0$.

14. The method of claim 5, wherein said matrix A and $A^t$ are each represented in the form of a sequence of numbers: $a_{11}, a_{12}, \ldots, a_n; a_{22}, \ldots, a_{2n}; \ldots; a_{nn}$.

15. The method of claim 6, wherein said matrix A and $A^t$ are each represented in the form of a sequence of $n^2$ numbers: $0, \ldots, 0; a_{22}, a_{23}, 0, \ldots, 0; \ldots; a_{n1}, a_{n2}, \ldots, a_{nn}$.

16. The method of claim 7, wherein said matrix A and $A^t$ are each represented in the form of a cross product which includes selecting a numbers $a = a_1, a_2, a_3$.

17. The method of claim 8, wherein said sequence of matrices $A = A_1, A_2, \ldots, A_s$ mapping from $V_1$ into $V_2$, wherein said secret elements $x^1, x^2, \ldots, x^s$ in $V_1$ space, said secret elements $y^1, y^2, \ldots, y^s$ in $V_2^*$ space, said $A(x) = A_1(x^1), A_2(X^2), \ldots, A_s(x^s)$, said $A^*(y) = A_1^*(y^1), A_2^*(y^2), \ldots, A_s^*(y^{s1})$, said $K_A = K^1_A, K^2_A, \ldots, K^s_A$, where $K^1_A = (x^1, A_1^*(y^1)), K^2_A = (X^2, A_2^*(y^2)), \ldots, K^s_A = (x^s, A_s^*(y^s))$, said $K_B = K^1_B, K^2_B, \ldots, K^s_B$, where $K^1_B = (A_1(x^1), y^1), K^2_B = (A_2(x^2), y^2), \ldots, K^s_A = (A_s(x^s), y^s)$.

18. The method of claim 9, wherein said matrices includes selecting a sequence of numbers being represented as $C_0, C_1, \ldots, C_{n-1}$, with $C_0 = -(c_1 + \ldots + C_{n-1})$, said circulant square matrix A comprising:

$$\begin{pmatrix} C_0 & C_{n-1} & \ldots & \ldots & C_1 \\ C_1 & C_0 & C_{n-1} & \ldots & C_2 \\ \ldots & C_1 & C_0 & \ldots & \ldots \\ \vdots & \vdots & \vdots & \vdots & \vdots \\ C_{n-1} & C_{n-2} & \ldots & c_1 & C_0 \end{pmatrix}$$

19. A method for establishing key agreement between a first device and a second device over a communication channel, comprising the steps of:

selecting a topological linear space $V_1$, and a topological linear space $V_2$, space $V_1$ having a dual space $V_1^*$ and space $V_2$ having a dual space $V_2^*$;

selecting a singular linear operator T, mapping linear space $V_1$ into linear space $V_2$, and then its singular conjugate operator $T^*$, mapping dual space $V_2^*$ into dual space $V_1^*$;

selecting in the first device, a secret element x in linear space $V_1$;

selecting in the second device, a secret element y in the dual space $V_2^*$;

sending the value T(x) from the first device to the second device;

sending the value $T^*(y)$ from the second device to the first device;

computing in the first device the value (x, $T^*(y)$);

computing in the second device the value (T(x), y);

using the value (x, $T^*(y)$) as the encryption key when sending a message from the first device to the second device, as well as the decryption key for the first device when receiving a ciphertext from the second device; and using as an encryption key (T(x), y) when sending a message from the second device to the first device, as well as the decryption key for the second device when receiving a ciphertext from the first device.

20. A method for establishing key agreement between a first device and a second device over a communication channel, comprising the steps of:

selecting a Hilbert space $V_1$ and a Hilbert space $V_2$ with a space $V_1$ having a dual space $V_1^*=V_1$, and space $V_2^*$ having a dual space $V_2^*=V_2$;

selecting a singular linear operator T mapping space $V_1$ into space $V_2$, and its singular conjugate operator $T^*$ mapping space $V_2$ into space $V_1$;

selecting in the first device, a secret element x in space $V_1$;

selecting in the second device, a secret element y in the space $V_2$;

sending the value T(x) from the first device to the second device;

sending the value $T^*(y)$ from the second device to the first device;

computing in the first device the value (x, $T^*(y)$);

computing in the second device the value (T(x), y);

using the value (x, $T^*(y)$) as the encryption key when sending a message from the first device to the second device, as well as the decryption key for the first device when receiving a ciphertext from the second device; and using as an encryption key (T(x), y) when sending a message from the second device to the first device, as well as the decryption key for the second device when receiving a ciphertext from the first device.

* * * * *